(12) United States Patent
Haag et al.

(10) Patent No.: US 8,142,301 B2
(45) Date of Patent: Mar. 27, 2012

(54) MEASURING DEVICE FOR MEASURING HITTING PARAMETERS OF A GOLF CLUB AND ASSOCIATED CALIBRATION DEVICE

(75) Inventors: Hans-Joachim A. Haag, Waldbrunn (DE); Josef Gödde, Greifenstein-Nenderoth (DE)

(73) Assignee: HGM GmbH - Haag Golf Messtechnik, Waldbrunn (DE)

( * ) Notice: Subject to any disclaimer, the term of this patent is extended or adjusted under 35 U.S.C. 154(b) by 1037 days.

(21) Appl. No.: 12/079,099

(22) Filed: Mar. 25, 2008

(65) Prior Publication Data

US 2008/0200274 A1 Aug. 21, 2008

Related U.S. Application Data

(63) Continuation-in-part of application No. PCT/DE2006/001700, filed on Sep. 26, 2006.

(30) Foreign Application Priority Data

Sep. 26, 2005 (DE) .......................... 10 2005 046 085

(51) Int. Cl.
*A63B 57/00* (2006.01)
*A64F 13/00* (2006.01)

(52) U.S. Cl. .......................................... 473/222; 463/3

(58) Field of Classification Search .................. 473/222, 473/223, 198; 273/186.1; 463/3
See application file for complete search history.

(56) References Cited

U.S. PATENT DOCUMENTS

| | | | |
|---|---|---|---|
| 4,137,566 A * | 1/1979 | Haas et al. .................... | 473/209 |
| 4,160,942 A * | 7/1979 | Lynch et al. .................. | 359/443 |
| 4,254,956 A | 3/1981 | Rusnak | |
| 4,304,406 A | 12/1981 | Cromarty | |
| 4,306,722 A | 12/1981 | Rusnak | |
| 4,545,576 A * | 10/1985 | Harris ........................... | 473/468 |
| 4,713,686 A * | 12/1987 | Ozaki et al. ................... | 348/157 |
| 5,111,410 A * | 5/1992 | Nakayama et al. ........... | 434/258 |
| 5,803,823 A | 9/1998 | Gobush et al. | |
| 6,095,928 A | 8/2000 | Goszyk | |

(Continued)

FOREIGN PATENT DOCUMENTS

CA 2 367 797 7/2002

(Continued)

OTHER PUBLICATIONS

International Search Report.

(Continued)

*Primary Examiner* — Peter DungBa Vo
*Assistant Examiner* — Jeffrey Wong
(74) *Attorney, Agent, or Firm* — Collard & Roe, P.C.

(57) ABSTRACT

A measurement setup to determine hitting parameters of a golf club includes a group of reflectors with at least two strip-shaped reflectors with retroreflective surfaces applied to the golf club shaft. The group of reflectors is attached to the club shaft with a detachable, yet tight clamp-connection. At least three retroreflective areas are arranged in a determined geometry at the club shaft and/or at the group of reflectors. At least one first reflective light barrier sends its beam at a right angle to the ideal swing path of the club head near the tee and/or the golf ball at the group of reflectors. During the penetration of the beam the three strip-shaped retroreflective surfaces elicit temporally staggered pulse-shaped signals that the receiver of the first reflective light barrier receives and which it transmits to the data acquisition device. A calibration setup is also provided.

32 Claims, 15 Drawing Sheets

U.S. PATENT DOCUMENTS

| | | | |
|---|---|---|---|
| 6,106,407 | A | 8/2000 | Peyton, Jr. |
| 7,857,708 | B2 * | 12/2010 | Ueda et al. .................... 473/257 |
| 2003/0054898 | A1 | 3/2003 | Otten et al. |
| 2005/0130755 | A1 | 6/2005 | Lindsay |
| 2005/0202907 | A1 | 9/2005 | Otten et al. |
| 2005/0205240 | A1 | 9/2005 | Ellsworth, Jr. et al. |
| 2005/0215335 | A1 | 9/2005 | Marquardt |

FOREIGN PATENT DOCUMENTS

| | | |
|---|---|---|
| DE | 101 03 449 | 8/2002 |
| DE | 101 19 740 | 10/2002 |
| WO | WO 98/18010 | 4/1998 |
| WO | WO 99/49944 | 10/1999 |
| WO | WO 2004/067099 | 8/2004 |

OTHER PUBLICATIONS

Official English translation of the International Preliminary Report on Patentability (prepared by International Office).

International Preliminary Report on Patentability with English translation of same (and translation of claim 27).

"PGA Teaching Manual: Lehr- und Lernunterlagen für Auszubildende zum Diplom-Golfprofessional," issued 2001, Professionals Golf Association of Germany, (PGA Professional Oliver Heuler's article "Golftechnik"), pp. 1-9. (Spec, p. 1).

* cited by examiner

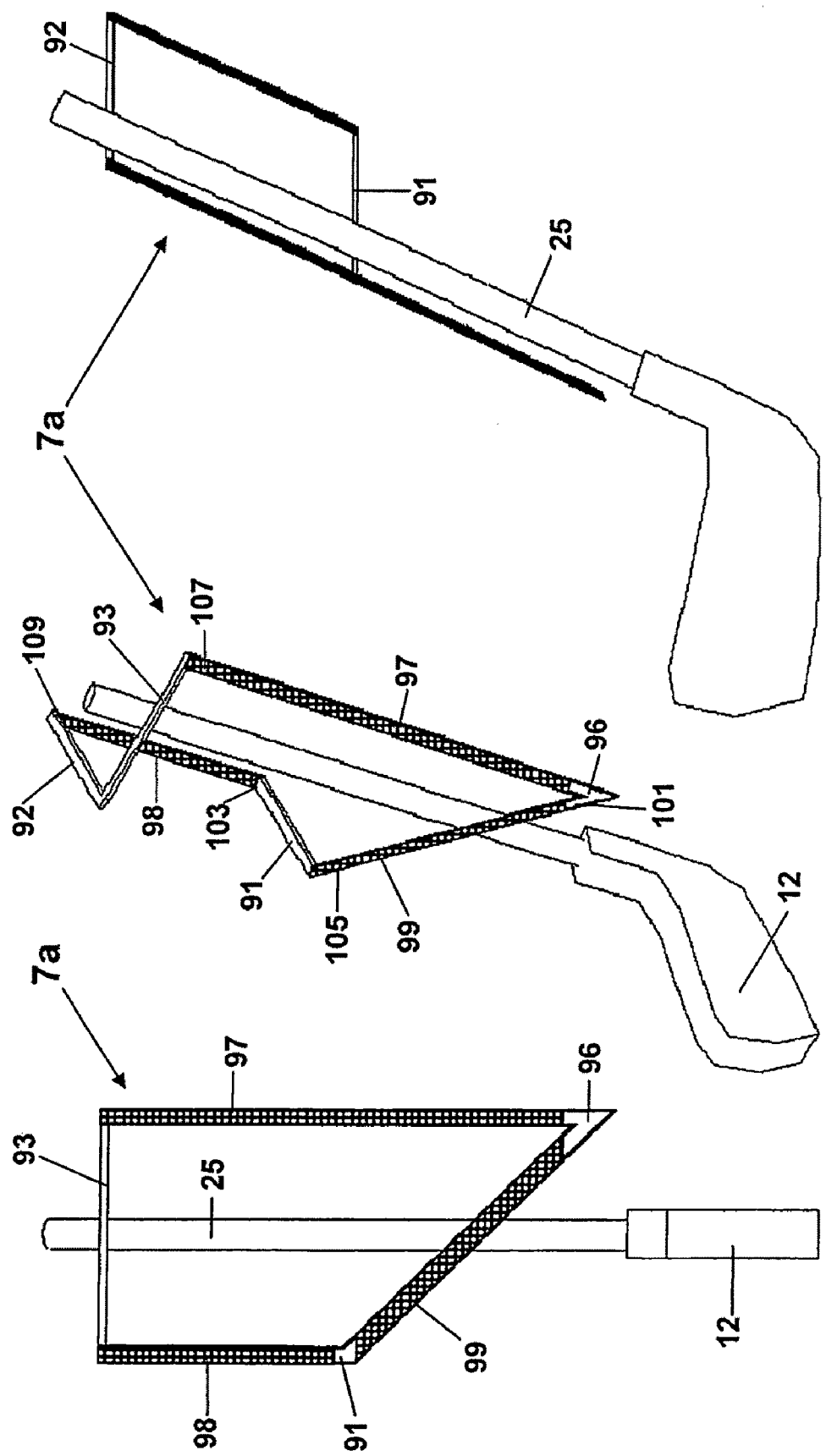

MEASURING DEVICE FOR MEASURING HITTING PARAMETERS OF A GOLF CLUB AND ASSOCIATED CALIBRATION DEVICE

CROSS REFERENCE TO RELATED APPLICATIONS

Applicants claim priority under 35 U.S.C. 119 of German Application No. 10 2005 046 085.2 filed Sep. 26, 2005. Applicants also claim priority under 35 U.S.C. 120 of International Application No. PCT/DE2006/001700. This application is a by-pass continuation-in-part application of said International Application No. PCT/DE2006/001700 filed Sep. 26, 2006. The International Application under PCT Article 21(2) was not published in English. The disclosure of the aforesaid International Application and German application are incorporated by reference.

BACKGROUND OF THE INVENTION

1. Field of the Invention

The invention relates to a measuring device for measuring the hitting parameters of a golf club, including a measuring device with at least one horizontally pointing reflective light barrier, a data acquisition device integrated into the measuring device, reflectors with retro-reflective surfaces attached to the golf club in corresponding relationship with the reflective light barriers and an evaluating-, display- and storage unit to which the data acquisition device forwards the acquired data. The invention further includes a calibration device for measuring the translational and angular deviations relating to the measuring device according to the invention.

2. The Prior Art

A generally known sentence goes: "The way the ball is hit determines the way it flies (or rolls)". In the "PGA Teaching Manual, Lehr-und Lernunterlagen fur Auszubildende zum Diplom-Golfprofessional", issued 2001 by the Professional Golf-ers Association of Germany e.V. PGA Aus-und Fortbildungsgesellschaft mbH, PGA-Professional Oliver Heuler writes in his article "Golftechnik" that at the hitting moment eight parameters determine how the golf ball will fly, no matter, how these parameters are brought about. These hitting parameters are
  1. Club face position
  2. Dynamic lie
  3. Dynamic loft
  4. Horizontal angle of approach (swing path)
  5. Vertical angle of approach
  6. Hit the sweet spot (horizontally)
  7. Hit the sweet spot (vertically)
  8. Club head speed.

Much effort has been made to determine these hitting parameters and to use them for teaching purposes. In U.S. Pat. No. 4,304,406 it is disclosed to measure the hitting parameters
1. club face position angle open/closed ($A_{oc}$),
2. horizontal angle of approach in/out ($A_{io}$),
3. sweet spot position (SSP) and
4. club head speed (V)
by photo- or infrared detectors. A plurality of such detectors
  is integrated in a defined pattern into a playing mat and be illuminated from an intensive (infrared-) light source above the tee.

The detectors measure the relative times of shadowing during the passage of the club head. $A_{oc}$, $A_{io}$, SSP, and the club head speed V can be calculated from the known geometry of the detector pattern, the position of the light source and the times of shadowing.

In principle, this is a robust measurement method, but it is a disadvantage that the (infrared-) light source constitutes an annoyance in the view field of the player. Further, the detectors in the playing surface are prone to contamination and/or to damaging by the club head. A further disadvantage is the requirement of a special golf mat for the measurements.

Another method to determine the hitting parameters $A_{oc}$, $A_{io}$, SSP and V is known from U.S. Pat. No. 4,254,956. Especially arranged optical sensors in a playing mat are at this applied likewise. However, this method does not solely use clearly defined times of beam interruption, but the natural ambient light and analog signals that represent the degree of shadowing effects on particular diffusor disks during the passage of the club head. Thereby the analysis becomes difficult and is particularly problematic where the ambient light intensity varies quickly. Contrary to all appearances, this is always the case where people exercise in the light of fluorescent lamps with classical ballasts.

U.S. Pat. No. 4,306,722 discloses a method to determine the hitting parameter $A_{oc}$ with high accuracy. It employs a kind of reflective light barrier. Depending on $A_{oc}$ a mirror at the club head determines the point where the light barrier beam hits a two-dimensionally extended detector. This point is detected by an analogously operating electronic system and is converted to a $A_{oc}$ display value. With this method very precise results may be achieved, but in practice it shows some severe disadvantages:
  1. A mirror has to be arranged and exactly aligned between the player and the tee.
  2. Another exactly aligned mirror must be attached to the club head which may be damaged in cases of imprecise ball contact.

The above mentioned patents have in common that their realization depends on a large number of detectors or on a precise, under practical circumstances barely realizable beamline. These and similar measurement arrangements, in particular with optical sensors which are specifically arranged in a golf mat, which operate with ambient light or work as reflex sensors, are available on the market today.

In CA 2 367 797 another method for measuring the hitting parameters $A_{oc}$, $A_{io}$, SSP and V and in addition the initial ball speed and the rotation of the ball (sidespin and backspin) is described. According to this method spots of highly reflective foil are glued on the club head. Two electronic cameras and a flashlight record the critical stage of the golf swing. A light barrier provides the timing of the exposure and triggering of the flash light. The golf ball used is marked with special color rings. During the golf swing the flash lights are actuated several times, so that the cameras yield multiple exposure (stereo-) images in which the computer searches the reflective spots from which it calculates the club position at the instance of the exposure. The same computer determines the trajectory and rotation of the golf ball from the views of the golf ball and from the color rings on it.

This method provides information about the kinetics of the club, but it has also severe disadvantages. The assembly is so bulky, that practice may just be possible in fixed cabins. Furthermore, the arrangement of one branch of the triggering light barrier between the player and the tee is needed. Further, the costs for the components should prevent a wide-spread use.

U.S. Pat. No. 6,095,928 discloses a three-dimensional swing analysis in which the object moves through a space that is defined by a three-dimensional coordinate system. Measured are the angles, at which the object or the club head, respectively, pass through this space. Infrared LEDs produce diverging cones of light that shine on ball-shaped or spherical reflectors attached to the club head or to the shaft above the club head, whereupon the angles of reflection are determined by sensors, e.g. by photodiodes (InGaAs-Avalanche Photodiodes IADs). The system displays the trajectory of the club head. The hitting parameters are not determined in this way, the measurement setup is not qualified for that purpose. A further disadvantage is the liability of the measurement to faults by the use of ball-shaped reflectors which necessitate the use of special filters.

The WO 98/18010 also discloses a golf swing analyzer that measures the pre- and post-impact position and/or the movement of the golf club head and/or of the golf ball (spin components) during a golf swing. The measuring instrument comprises one or several light sources or one or several means that react to the reflections by a moving object (slotted openings and/or cylindric lenses arranged in a de-fined plane) that give a signal if the moving object interrupts a defined plane of detection. The moving object may be a golf club to the club head of which a lamellar or circular reflective zone or LEDs are attached. The setup is not suited to determine the hitting parameters. The same holds for US 2005/0130755 A1.

DE 101 03 449 A1 discloses a mobile setup for measuring the speed and/or the speed profile of a golf club head with the measurement being possible with or without golf ball. Therefore a sensor unit is attached to the golf club head and a display unit is attached to the golf club shaft and between them a flexible wire or a wire-less connection is foreseen for transferring data between the sensor unit (10) and the display unit. The gauging is based on determining the relative air speed with a Pitot tube or Prandtl's Pitot tube or based on the negative pressure or suction by means of a venturi meter or electronically (measurement of the movement of the golf club head relative to the ambient medium or relative to the ambient material, respectively) with a small lightweight sensor attachable to the golf club head without external transmitter- and receiver unit, or by radar (Doppler shift) or by choke measurement. In case of measurements with radar, a reflector is mounted on the shaft side of the club head. Alternatively or complementing the reflector, the golf ball-sided face of the club head can also be used as reflecting area.

Since the radar transceiver is arranged behind the golf ball in the heading direction of the ball flight, there is always some risk that badly struck golf balls may hit and damage the radar unit after takeoff. Hitting parameters cannot be assessed with such a simple measuring equipment. Displaying the maximum speed does not tell anything about the speed at the very moment of the impact, since the maximal club head speed may have been achieved shortly before or behind the point of ball contact.

DE 101 19 740 A1 discloses a putting trainer. In order to control the orientation of the putter club blade ($A_{oc}$), a narrow collimated beam of light is directed from an emitter to a reflector at the putter and to a receiver. The receiver is equipped with a row of particularly narrowly arranged sensors (photo transistors) on both sides of a central sensor. The reflector is a plane mirror whose back side butts against the club face. The emitter contains a laser whose narrow beam is detected after reflection by the mirror by the adjoining detectors in the receiver. A switching device (light barrier/photo transistor), which gives a signal when the put swing passes the golf ball position, activates the trainer for a short while. The golfer is shown minimal deviations of his putter from the ideal target line and furthermore deviations from the hitting point by light emitting diodes which are associated to each sensor in the receiver. This means that it is indicated whether the sweet spot (SSP) has been hit or missed. In this case the central sensor and the target position lie on top of each other. However, putting with a golf ball is precluded during this kind of training, else the mirror would be damaged. Although an embodiment is mentioned, in which the mirror is offset laterally to allow for putting a golf ball, such a setup is not suited for full swings, be it with or without ball.

US 2003/0054898 A1 discloses a golf swing analyzing system. In the surface of the casing body, which is made of a non-metallic material, a tee and optical sensors, preferably infrared reflective light barriers are inserted in three rows that run perpendicularly to the swing line left and right from the tee. Further sensors may be arranged centered in relation to the tee in towers at the front sides of the casing body to allow for measuring the height of the swing path. The sensors emit narrow infrared beams. A reflective strip is placed on the bottom side of the club head. By this strip the infrared beams are reflected during the passage of the club head. The sensors generate electrical signals which are transmitted via conventional cables to a data acquisition unit (controller) and converted in digital signals. From there the signals are forwarded to a evaluating-, display- and storage unit (computer) that calculates the hitting parameters $A_{oc}$, $A_{io}$, SSP and V from the temporal pattern of the signals. Displayed are both the actual data and comparative historical swing information.

This golf swing analysis system operates with numerous infrared reflective light barriers (37 pairs of QED123/QS-D123), each having a low angular resolution. The aperture angle of the transmitters is ±9°, the one of the receivers ±12°. The great number of infrared reflective light barriers makes the proposed system expensive. Further, the current needed alone for the infrared emitters sums up to significantly more than 3 A, which impedes battery-based operation. However some of the sensors serve the only purpose to trigger the system and to activate the current feed to the subsequent sensors. The essential components are integrated into a special golf mat, made of an elastic material. Such a setup is damageable by too lowly accomplished swings, particularly because the position and adjustment of all light barriers is essential for their aforementioned function. Too lowly accomplished swings also quickly disable the reflective strips glued to the bottom side of the club head so that these strips must be regarded as consumable material. A good temporal resolution of the proposed design can only be expected if the club head passes the mat at low distance. Else the aperture angle of the sensors is likely to produce strong time-jitter of the output signals, which renders the measurement imprecise or useless. (Already at 5 cm distance the acquisition cone has a diameter of 1.5 cm.) The necessarily short working distance causes another problem. Dependant on the type and brand, golf club heads have highly varying outer contours, often with reflective, almost mirroring surfaces. Hence the infrared reflective light barriers must be expected not only to respond to reflections from the retroreflective strip, but also to reflections from other spots on the club head surface.

US 2005/0202907 A1 describes an extension of US 2003/0054898 A1. It discloses some technical details that allow for an estimate of the achievable fidelity. The patent file mentions several times the temporal resolution of the sensors to be 10 μs ($\frac{1}{100000}$ s). In this time the golf club head moves forward approx. 0.278 mm at a speed of 100 km/h (which corresponds to a drive swing of moderate speed). The open/close-angle is determined by two sensors which can have a distance of maximally 5 cm on a line perpendicular to the moving direction of the club head to be safely flown over as a pair. Hence the angular resolution is at best $$\arcsin\left(\frac{0.27 \text{ mm}}{50 \text{ mm}}\right) = 0.31°$$

According to US 2005/0202907 A1 the height is determined by up to 4 displacement sensors that work by the triangulation principle of measurement. In comparison to other industrial applications, these sensors must respond relatively quickly (at only 100 km/h and at a depth of 15 mm, which is absolutely usual for irons, the underside lingers 0.54 ms over the sensor). This necessitates expensive special designs (standard sensor approx. 1000 €), which in addition are exposed to the risk of damage by the club head.

From WO 99/49944 a measuring setup is known, in which hitting parameters are determined by four laser sensors which are attached to the club. The sensors pass one or more fan-shaped laser beams which originate from one or more laser sources between the feet of the player. The responses of the laser sensors are transmitted via a short distance radio link to the evaluation electronics. Resolutions are reported to be 0.3° for the open/close angle, 0.1° for the dynamic loft, and 0.1° for the dynamic lie. The sweet spot resolution of the prototype is indicated to be 5 mm.

A disadvantageous feature of this setup is the position of the laser source near the feet of the player, which constitutes a dangerous stumbling block. Further, the applied, vertically pointing laser fans are either severely restricted in their power density or they can lead to irritation or even damage to the eyes in the vicinity of the orifice of the laser source.

WO 2004/067099 A2 describes a golf swing analysis by a budget-priced video camera. Spheres of approx. 10 cm ø with distinctive high-contrast patterns are attached to the golf cub shaft directly below the grip zone. Alternatively, the spheres contain active light sources for practicing in low light conditions. That way the track of the club in the swing plane and particularly the posture of the player in the different stages of the swing movement can be reconstructed to correct the player. No indications are released concerning the achievable accuracy of hitting parameters like sweet spot or open/closed angle. A USB-camera serves as sensor. USB cameras are inexpensive, indeed, but they offer bad frame rates (consumer type USB-cameras today 80 fps at maximum) and cannot be synchronized to the stages of the swing.

Another analyzer with two cameras is known from U.S. Pat. No. 5,803,823. The analyzer monitors the movement of a golf club shortly before and during contact to the golf ball and the characteristics of the movement of the golf club shortly before contact to the golf ball. Both camera units take 2-dimensional images. At the golf club and at the golf ball, respectively two or more dot-shaped areas of retro-reflective material are arranged in a way that two flashes that are elicited in a flashlight get reflected by the dot-shaped areas and recorded by the camera units which are arranged opposite to the golfer as 2-dimensional patterns while the shutters are open. From the dot-patterns the trajectory of the club head and its orientation relative to the golf ball are determined whereas the characteristics of the movement of the golf club are determined by comparison of two positions of the illuminatable areas at the golf club in relation to the illuminatable areas at the golf club. Such an image analysis is extensive, expensive and coarsely rasterized. Another disadvantage of this kind of analyzer is that reflective dots have to be attached to the golf ball, which might get damaged at each stroke. Further, it is not possible to play without a golf ball with such a measuring setup.

Furthermore, in U.S. Pat. No. 5,803,823 two calibration setups for the measurement setup are described. The first calibration setup consists of a 3-dimensional models with 20 spots of ¼" diameter for calibrating the two cameras. For localizing the sweet spot the second calibration setup provides to the measurement setup the information where the geometrical center is situated on the club face of the club head. Therefore a circular disk with three studs which are arranged in one X-axis and which point perpendicularly away from the disk and which also bear a retroreflective spot, is glued on the club face and calibrated. With a calibration photograph eleven constants of each camera plus the X-, Y-, and the Z-axis are determined.

SUMMARY OF THE INVENTION

The object of the invention is to provide a measuring system for measuring the hitting parameters which is easy to handle, mobile, compact, applicable indoor and outdoor, with and without golf ball, usable for right- and left hander alike, and is nevertheless cost/effective, which uses a high-precision measuring method and to provide a calibration device that ensures trustworthy data.

This object is achieved by the features disclosed below in accordance with the invention.

The measuring system according to the invention includes a measuring device that may be positioned or arranged opposite to a golfer. A group of at least three reflectors is attached to the shaft of the golf club by a snap ring or another type of tight, but detachable clamp-connection with the group of at least three reflectors having respective retroreflective surfaces, being made up of at least two strip-shaped reflectors, and being arranged with specific, defined geometry. The measuring system can be arranged such that at least one reflective light barrier points with at least one horizontal beam at a right angle across the swing path of a club head of a golf club near at least one of a tee and a golf ball and to the group of reflectors. Upon passage of the beam, the three retroreflective surfaces generate temporally staggered impulse-shaped data, which the sensor or receiver of the reflective light barrier receives and which it forwards to the data acquisition unit as acquired measured data. The latter transmits or forwards the measured data to an information output- and storage unit such as a an evaluating-, display- and storage unit.

Laterally from the first reflective light barrier at least one second reflective light barrier may be arranged whose beam encounters the beam of the first reflective light barrier at an acute angle. A plurality of further reflective light barriers may be provided. These provide predominantly a confident and exhaustive acquisition of all impulses from the reflectors of the group of reflectors—furthermore called pulses—which are needed to calculate the hitting parameters.

The calibration appliance according to the present invention serves to measure the angular deviation in the mounting of the group of reflectors to the golf club from the right angle to the club head. This calibration appliance consists of a calibrator with at least one rotating reflective light barrier, a mechanical adjustment setup at an exactly known distance from the calibrator, with the mechanical adjustment setup containing an edge guide for the club head face and at least two reflectors with retroreflective surfaces which are arranged behind the group of reflectors to be calibrated at some lateral distance to the latter. Such a calibration appliance is integrated into the measuring system according to the invention.

The invention, for which patent protection is requested, is capable of measuring hitting parameters. With a simple measuring device, for which in its simplest embodiment according to the invention only one reflective light barrier is needed, and a low/wide group of reflectors may be used that includes five reflectors wherein three reflectors are arranged parallel each other in one plane and in a well defined distance from each other in which the first reflector and the third reflector are joined with the second reflector in a way that the first, second and third reflectors form an "N" or a mirror-imaged "N" and in which the fourth reflector is arranged outside the plane of, but running parallel and at equal distance to, the third reflector and the fifth reflector so that in a top view of the group of reflectors a triangle between the third reflector, the fourth reflector and the fifth reflector is discernible. The measuring system in this form can measure the hitting parameters:
1. Club head speed V
2. Club face position angle open/closed $A_{oc}$, and
3. Sweet spot (vertical deviation).

By the employment of a second horizontally pointing reflective light barrier at a defined acute angle to the first reflective light barrier according to an embodiment of the invention the hitting parameters
4. Hit the sweet spot (horizontal deviation) and
5. horizontal angle of approach in/out $A_{io}$ can be determined additionally.

An additional facility with a further reflective light barrier according to an embodiment of the invention or the employment of a measuring system according to a further embodiment of the invention with a group of reflectors according to another aspect of the invention allows for the measurement of the
6. angle of dynamic loft $A_{dl}$.

With the additional attachment of a radar transceiver according to an embodiment of the invention, with Doppler frequency measuring may be measured in addition
7. a performance indicator number for the unleashing of the wrist and
8. the time course of the club head speed during the downswing from its entry to the radar beam, at the hitting instant until leaving of the radar beam, and
9. for the purpose of triggering the direction of the movement of the club head with the aid of a inphase/quadrature mixer.

The second kind of measuring the club head speed at the hitting instant by Doppler analysis is concomitantly used as an independent control measurement. If there are significant differences between these measurements, the learner is invited by optical signals or verbally to re-calibrate the golf club with the attached group of reflectors by means of the calibration appliance according to an embodiment of the invention.

The apparatus according to the invention is particularly applicable in golf training centers. With the help of the attained data, golf teachers can provide much more specific training hints to improve the performance of their golf students. But also technically interested golf apprentices, who want to examine in depth the "why" of their unsuccessful swing, may acquire the apparatus according to the invention and tee off balls at the driving range or train the optimal swing at home, also without golf ball. The particular advantage is the high learning efficiency, because the attained data are presented instantaneously after accomplishment of the swing, at a time, when the apprentice still gets feedback about his physical approach from his musculature.

The device is easily operated without additional help. Special switches that react to the club head, enable the golf student to operate the device without the need to move to the PC or laptop.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 14 is a diagrammatic sketch of a high/narrow group of reflectors according to the invention attached to the shank of a golf club in front view;

FIG. 15 is a diagrammatic sketch of a high/narrow group of reflectors according to the invention attached to the shank of a golf club according to FIG. 14 in a three-dimensional view;

FIG. 16 is a diagrammatic sketch of a high/narrow group of reflectors according to the invention attached to the shank of a golf club according to FIGS. 14 and 15 in side view;

DETAILED DESCRIPTION OF PREFERRED EMBODIMENTS

Figure 1:
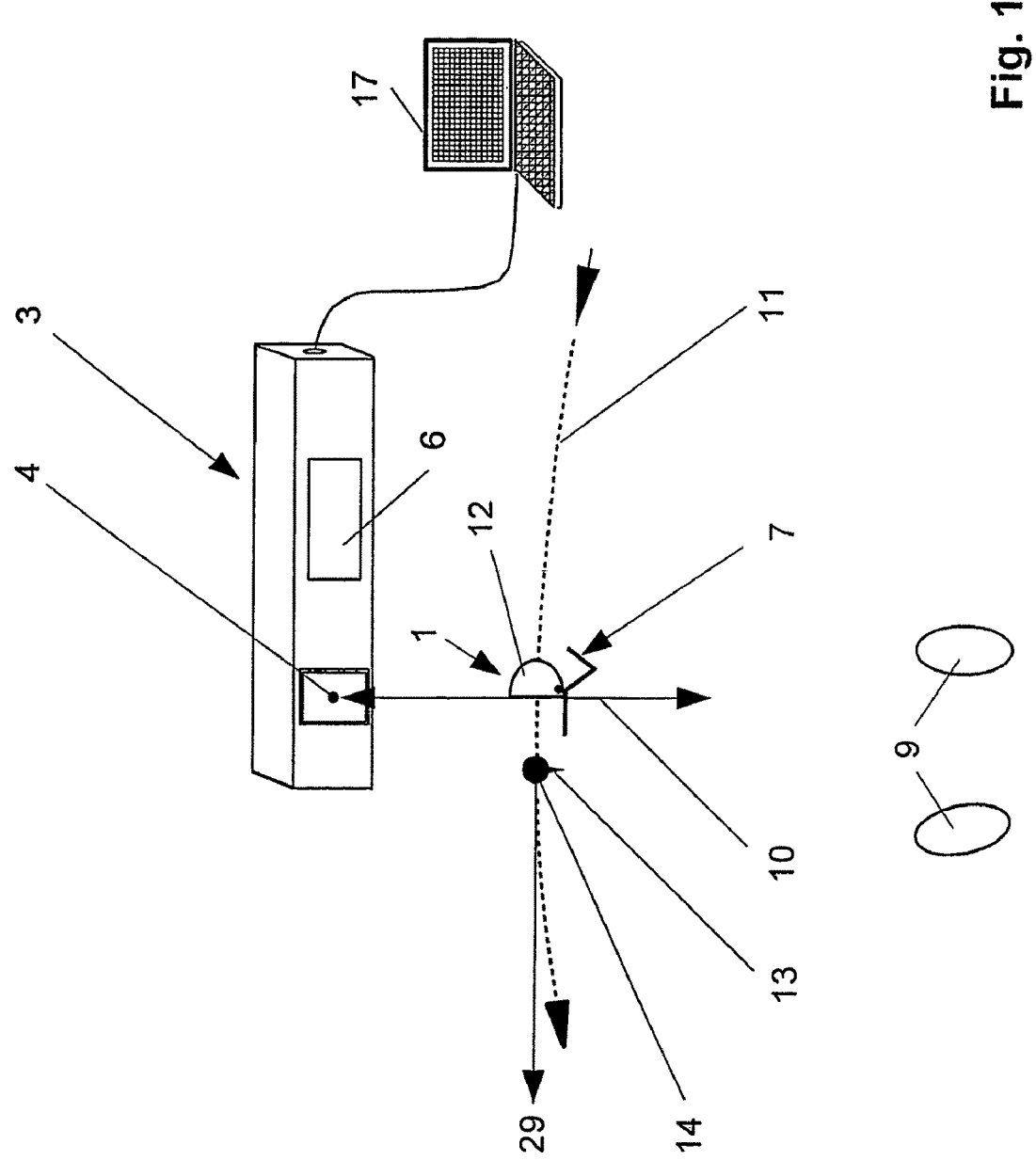
FIG. 1 is a diagrammatic sketch of a measuring device according to the invention in a first embodiment to determine the hitting parameters club head speed, club face angle open/closed $A_{oc}$, and hit the sweet spot (vertical)

The measuring system pertaining to the invention for measuring hitting parameters of a golf club 1 as shown in FIG. 1 consists of a measuring device 3 and a group of reflectors 7 attached to the golf club 1. The measuring device 3 is arranged opposite to the golfer 9 and comprises at least one horizontally pointing reflective light barrier 4 and a data acquisition unit 6, preferably integrated into the measuring device. The reflective light barrier 4 sends a beam 10 at right angle to the ideal swing path 11 of the club head 12 near the tee 13 and/or the golf ball 14, where the group of reflectors 7 that is attached to the golf club 1, upon passing the beam 10, generates measuring data as impulses that are sent back to the reflective light barrier, which then are captured by the data acquisition unit 6 and forwarded to an information output- and storage unit 17.

FIG. 1 shows a low/wide embodiment of a group of reflectors 7, that is specified in the following with the help of FIGS. 2 and 3.

Figure 2:
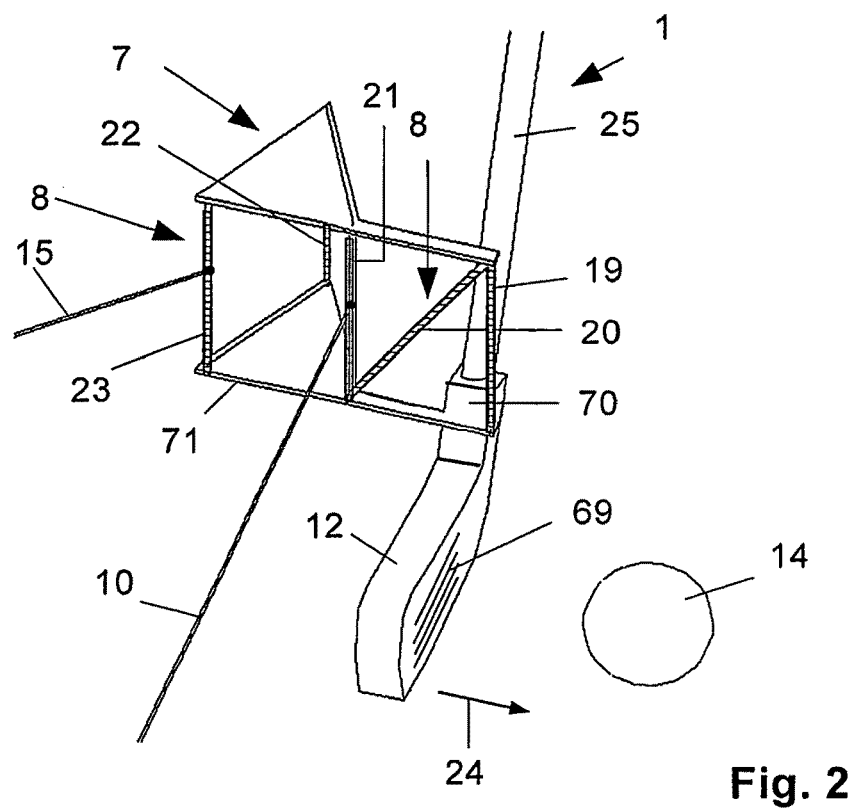
FIG. 2 is a front view of a golf club with an embodiment of a low/wide group of reflectors according to the invention, whereas the group of reflectors is mounted in a way that it is perpendicular to the floor when the club is held in the addressing position.

The low/wide group of reflectors 7 in an embodiment as shown in FIG. 2 is attached to the golf club 1 above the club head 12 in a way, that the group of reflectors 7 is perpendicular with respect to the playing surface 18, when the golfer holds the club inclined in the addressing position. The golfer 9 adopts the addressing position immediately before each swing. In doing so the golfer 9 stands with extended arms and splay-footedly approximately centered in front of the golf ball 14. From the golfers 9 view, the club head 12 is right of the golf ball 14. The golf club shaft is inclined towards the golfer. With the same angle of inclination the golf club 1 later also reaches the golf ball 14 during the downswing.

Figure 3:
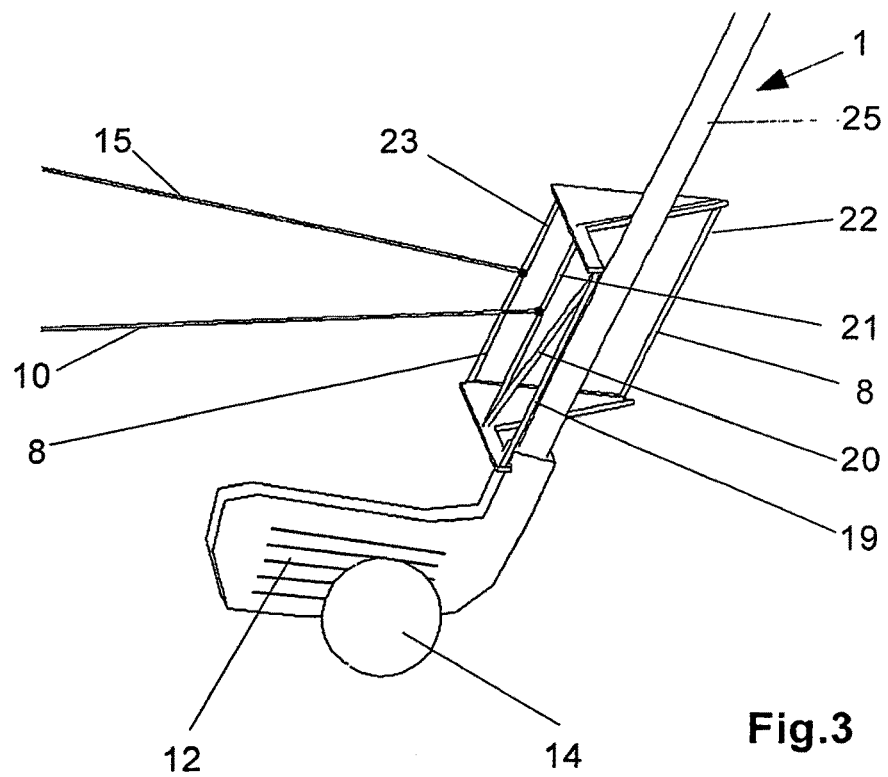
FIG. 3 is a lateral view of a golf club with the group of reflectors according to FIG. 2 mounted parallel to the club shaft.

In the embodiment according to FIG. 3 the low/wide group of reflectors 7 is arranged parallel with the shaft 25 of the golf club. Also in the addressing position and during the golf swing its upper part is inclined towards the golfer.

Because of the simpler mounting to the golf club, the embodiment according to FIG. 3 is assumed in the following.

The low/wide group of reflectors 7 pertaining to the invention according to FIG. 3 comprises five reflectors 19, 20, 21, 22, 23, of which three reflectors 19, 21, 23 are arranged in one plane at right angle with respect to a bottom line 71 and parallel and at a precisely defined distance to each other, with the first reflector 19 and the third reflector 21 being joint with each other with the second reflector 20 in a way that they constitute an "N" or a mirror-imaged "N". The fourth reflector 22 is arranged outside the plane, but parallel and preferably at equal distance to the third reflector 21 and the fifth reflector 23 in a way that with this embodiment, the top view shows an equilateral triangle between the third reflector 21, the fourth reflector 22 and the fifth reflector 23.

The low/wide group of reflectors 7 is attached to a golf club 1 by a detachable, tight clamp-connection which prevents that the group of reflectors might slacken and/or twist during swings with speeds of up to 200 km/h or even 230 km/h. The reflectors 19, 20, 21, 22, 23 consist of strip-shaped retroreflective surfaces 8 with a strip width of at least the same, preferably the double width of the beam 10. All times measured by the reflective light barrier 4 are referred to by the center times of the respective reflex-pulse. The individual reflectors 19, 20, 21, 22, 23 are kept in their relative positions by a stable, non-reflective frame or they are glued or fixed in another way to the golf club shaft or to this frame with which they constitute the low/wide group of reflectors 7.

The reflective light barrier 4, preferably a high-frequency laser reflective light barrier, comprises a transmitter and a receiver. In case of an ideal swing the beam 10 (laser beam) hits the passing low/wide group of reflectors 7 preferably centrically and passes the fifth reflector 23 immediately before the hitting point 2. Upon passing the beam 10, each of the reflectors 19, 20, 21, 22, 23 reflects an impulse to the receiver of the reflective light barrier 4. These impulses are read out as a temporal pattern and are forwarded to or captured by the data acquisition unit that may be made up of a sound card or another kind of multi-channel data acquisition device. The sound card or the multi-channel data acquisition- and processing unit may be equipped with software to interpret acquired measured data. From there the raw data are transferred to an information output- and storage unit 17, stored and advertised to the golfer 9 as measurement result within seconds. The information output- and storage unit can determine any of the hitting parameters of:

a) a club head speed,
b) a club face position as angle open/closed,
c) a sweet spot vertical as vertical deviation from a sweet spot,
d) a sweet spot horizontal as horizontal deviation from the sweet spot,
e) a horizontal angle of approach in/out, and
f) a dynamic loft.

The golf ball 14 must be placed at a such distance from beam 10, that its hitting point is not reached until all five reflectors have passed the beam 10, because in the hitting instant it would come to a deceleration and possibly to tilting of the club head 12 and concomitantly of the group of reflectors 7. Further, the golf ball 14 must be situated at a position whose coordinates with respect to the measuring device are exactly defined, with—in the first embodiment—the distance to the measuring device, to the beam 10 and the height of the Tee 13 above the playing surface 18 preferably being determined by a template.

With a measurement setup according to FIG. 1 and the low/wide group of reflectors 7 according to FIG. 1 and/or FIG. 2 the following hitting parameters can be measured:

a) Club head speed V,
b) club face position angle open/closed $A_{oc}$, and
c) hit the sweet spot (vertical deviation)

The measurement setup exploits the fact, that shortly in front of the hitting point 2, the club head experiences barely any acceleration tangentially to its trajectory. Thus, with the help of light barriers, the spatial optical pattern of the low/wide group of reflectors 7, that moves in parallel with the club head 12, can be read out as a temporal pattern.

The hitting parameter club head speed V is determined by the first reflective light barrier 4 from the time respectively time difference of the impulses from the first reflector 19 and the fifth reflector 23 and the distance of these reflectors 19, 23 from each other as the mean speed during the passage of the beam 10. The club face angle open/closed $A_{oc}$, and the horizontal angle of approach in/out $A_{io}$ affect the calculus with their cosine and can be compensated if necessary.

Figure 4:
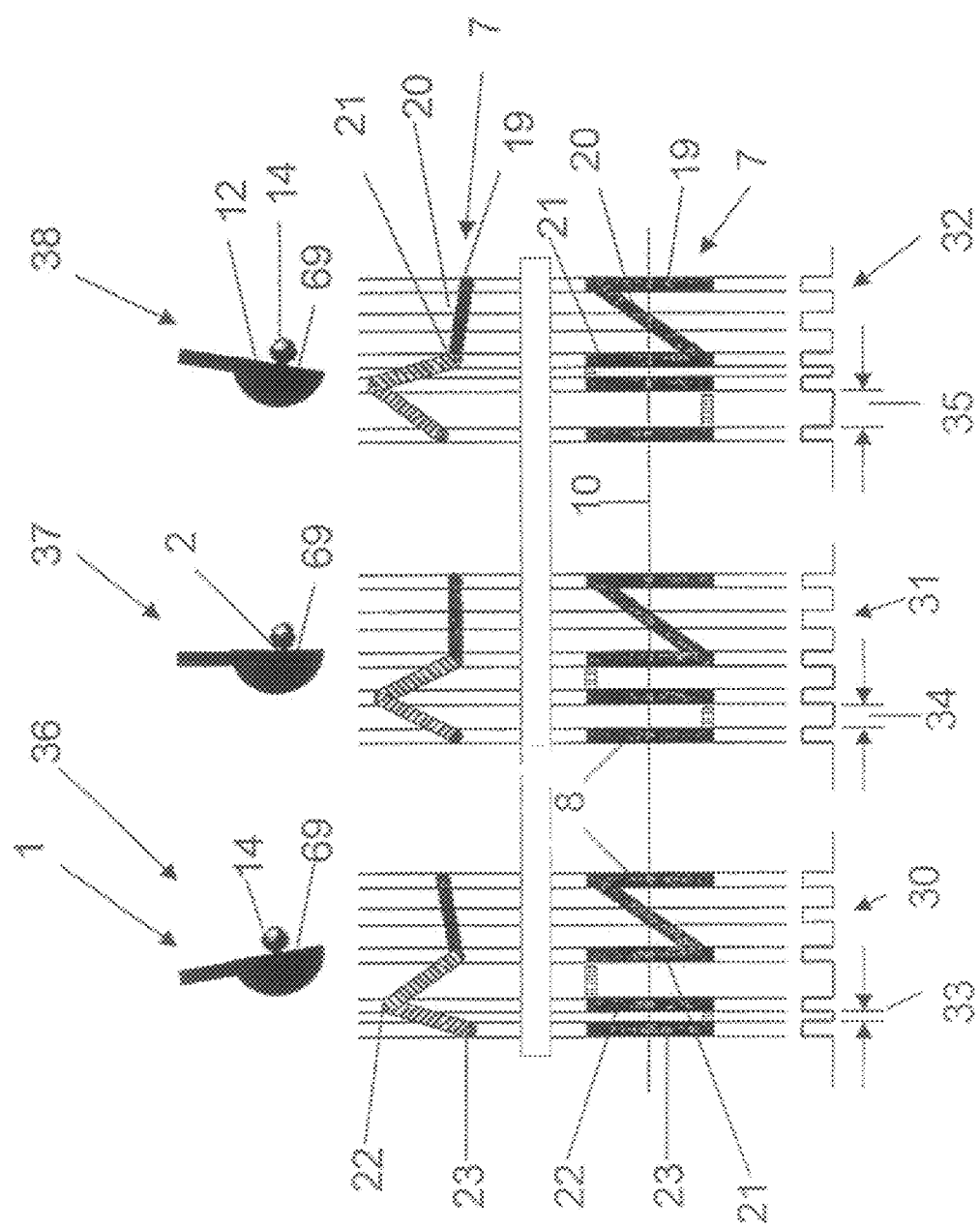
FIG. 4 is a diagrammatic sketch of the sequence of impulses for determining the club face angle open/closed $A_{oc}$, of a golf swing with a low/wide group of reflectors according to FIGS. 1 and/or 3.

FIG. 4 shows the principle behind the determination of the club face position 36, 37, 38 as club face angle open/closed $A_{oc}$.

The $A_{oc}$, which is determined at the first reflective light barrier 4, indicates the angle, by which the club face 69 is turned left or right in the hitting point 2. In case of an ideal club face position 37 the golf ball flies straight to the target. The temporal pattern 31 shows, that the signals that originate from the reflectors three, four and five 21, 22, 23, are equally spaced.

In case of a counterclockwise turn the club face 69 hits the right side of the golf ball 14. The swing goes out-to-in, the golf ball 14 raises leftward and turns further left during the flight. FIG. 4 shows in a top view on the group of reflectors 7, that the plane of the group of reflectors 7 is also turned counterclockwise, This is a closed club face position 36. The front view on the group of reflectors and the concomitant temporal pattern 30 below show, that the time interval 33 between the impulse of the fourth reflector 22 and the impulse of the fifth reflector 23 is smaller than in the time pattern 31.

In case of an open club face position 38, it is obvious from the front view of the group of reflectors 7 and from the concomitant temporal pattern 32, that the time interval 35 between the fourth and the fifth reflector 22, 23 is larger than in the case of the ideal club face position 37.

Determining the sweet spot SSP is problematic insofar as the actual sweet spot may be different from club to club. With the applied measuring method, it is assumed, that the sweet spot is situated as commonly assumed in the crossing point of the diagonals through the club blade 69. In case of doubt this must be inquired at the manufacturer and has to be accounted for when the golf ball 14 is aligned.

Figure 5:
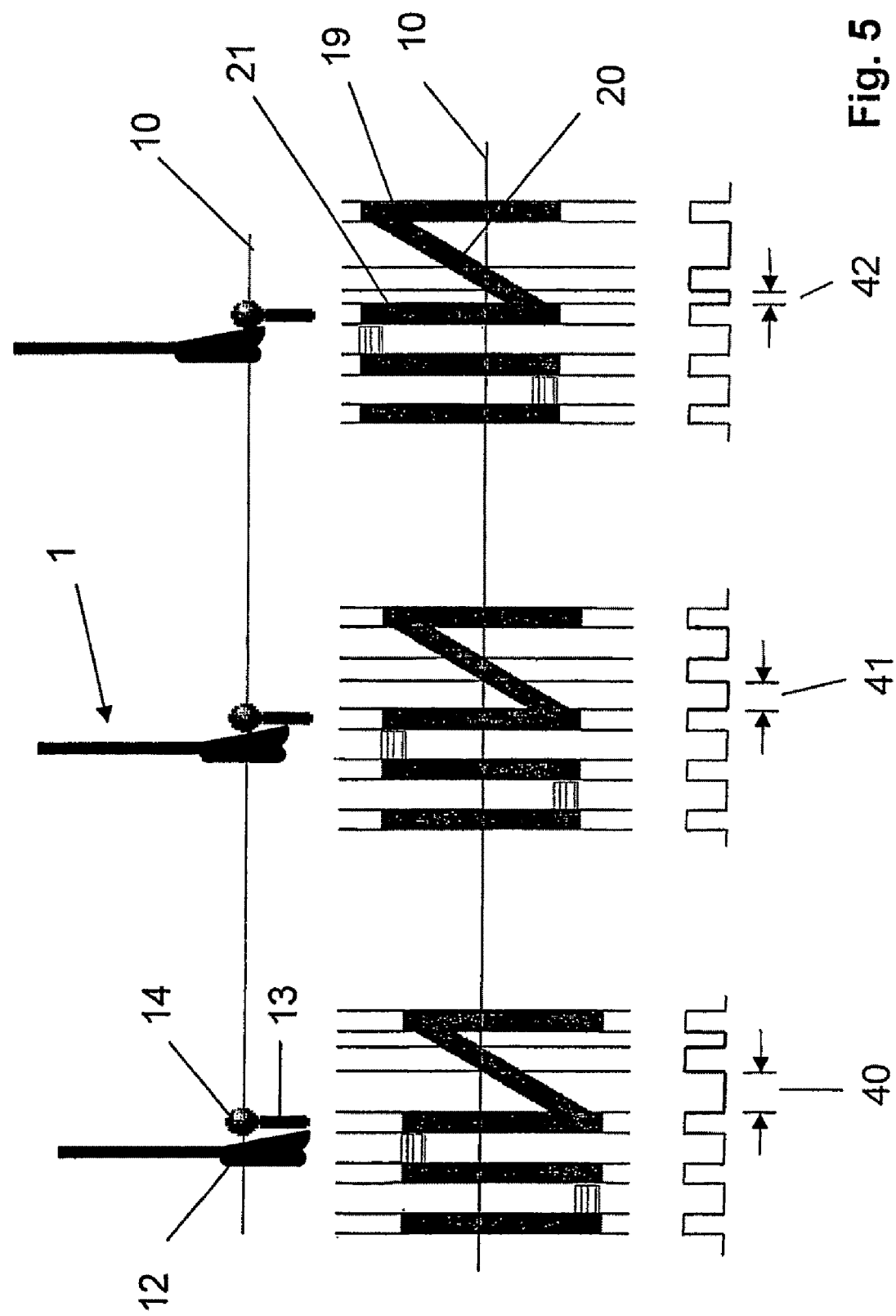
FIG. 5 is a diagrammatic sketch of the sequence of impulses for determining the vertical deviation from the sweet spot of a golf swing with a low/wide group of reflectors according to FIGS. 1 and/or 3.

By the measuring method according to the invention, the exact point of contact of the golf ball 14 on the club face 69 is determined. This means, that not the sweet spot itself, but the deviation from the theoretical sweet spot is determined and displayed. The evaluation of the vertical deviation from the sweet spot is shown in FIG. 5. Here the vertical deviation from the sweet spot is determined from the relative interval of the pulses from the first reflector 19 and the second reflector 20 as well as the second reflector 20 and the third reflector 21 by the beam 10 of the reflective light barrier 4. The time interval 41 of the impulses in case of pulses that hit the sweet spot exactly, is identical. Contrastingly, the time interval 40 between the impulses of the second reflector 20 and the third reflector 21 is larger in case of too low conducted swings, in case of too low conducted swings, the interval 42 of the pulses is smaller.

Figure 6:
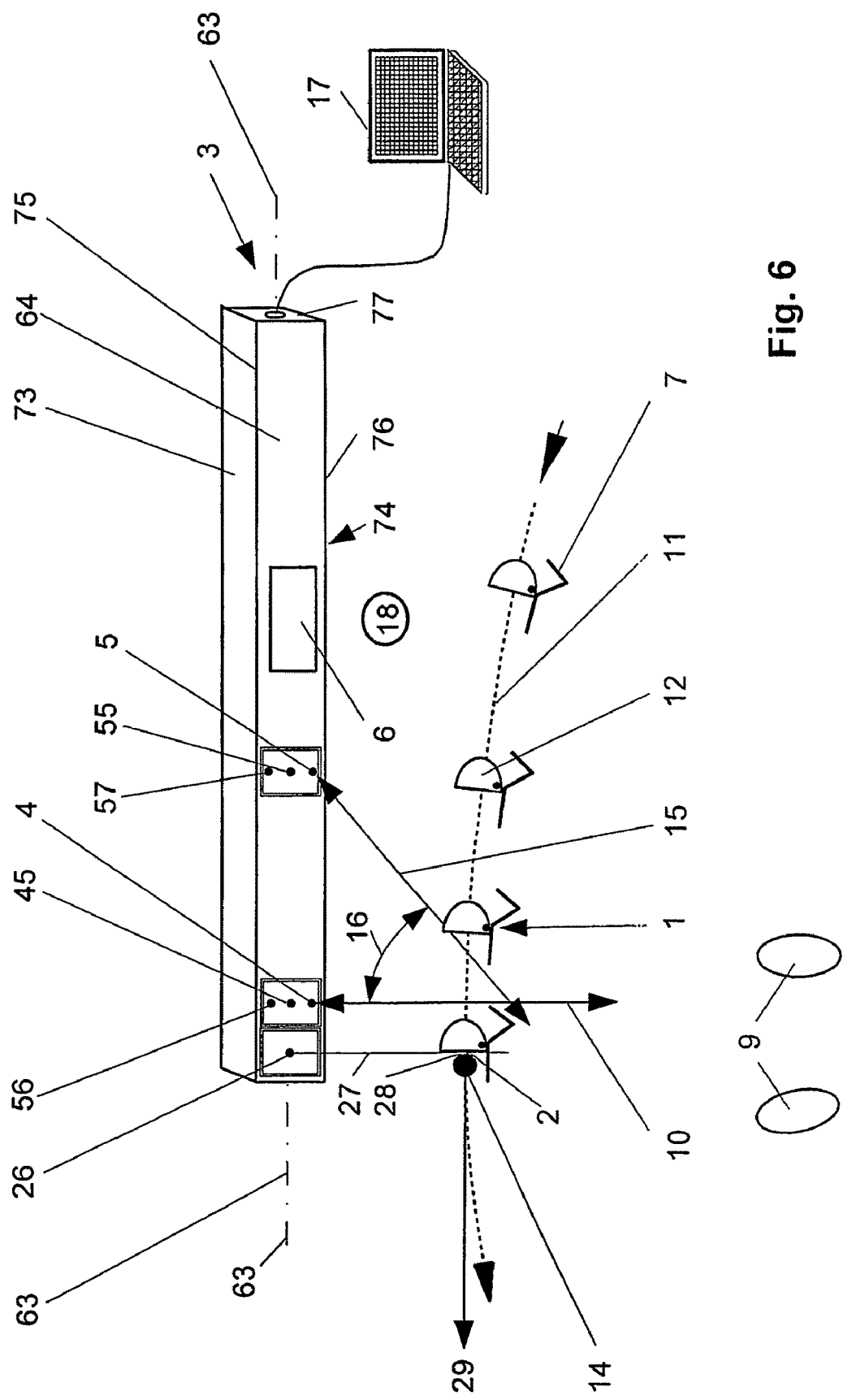
FIG. 6 is a diagrammatic sketch of a measuring device according to the invention in a second embodiment for determining the hitting parameters hit the sweet spot (horizontal) and horizontal angle of approach (swing path) $A_{io}$.

To facilitate the placement of the golf ball, in another embodiment according to FIG. 6, left of the reflective light barrier 4 an additional optical line laser was placed, which is directed at an angle of 90° to the golf ball 14 in a way that its beam 27 meets at a meeting point the surface of the golf ball 14 opposite to the flight direction 29, where the meeting point on the surface 28 of the golf ball constitutes the ideal hitting point for the club head. In a line laser the intrinsically point-shaped laser beam is transformed by an optical lens in a line-shaped beam 27. However, it is in the scope of this invention also to employ conventional lasers for this purpose.

In order to use the measurement system according to the invention to measure the horizontal deviation from the sweet spot and the horizontal angle of approach in/out $A_{io}$, the measuring device 3 comprises according to FIG. 6, with a second reflective light barrier 5, whereupon the second reflective light barrier 5 with its likewise horizontally directed beam 15 encounters the beam 10 of the first reflective light barrier 4 at an acute angle, with the cross-over point of the two beams 10, 15 lying a few centimeters behind the ideal swing path 11. If a sound card is used as data acquisition device 6, the distance of beam 15 from beam 10 must be slightly larger than the length of the group of reflectors 7 so that the impulses do not superimpose. In this case the beams 10, 15 hit the retroreflective surfaces 8 successively. If a multi channel data acquisition device is used as data acquisition unit 6, beam 10 and beam 15 may intersect above the ideal swing path 11. The acute angle of intersection of the crossing beams 10, 15 is preferably 45°. In this case the beams 10, 15 hit the reflectors 19, 20, 21, 22, 23 simultaneously.

Figure 7:
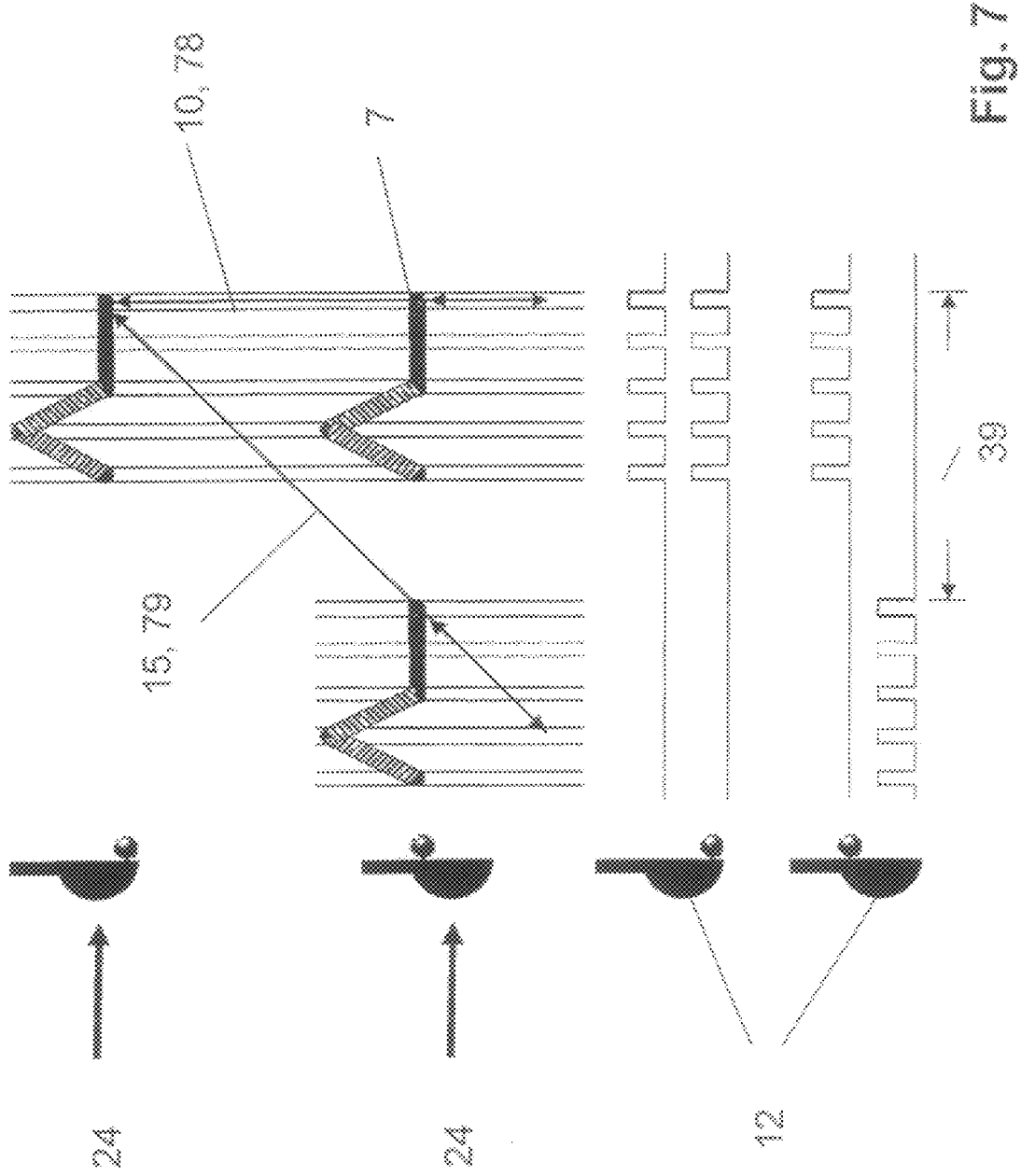
FIG. 7 is a diagrammatic sketch of the sequence of impulses for determining the horizontal deviation from the sweet spot of a golf swing with a low/wide group of reflectors according to FIGS. 1 and/or 3.

FIG. 7 shows a diagrammatic sketch of the measuring method to determine the horizontal deviation from the sweet spot. The precise hitting point of the golf ball 14 on the club face 69 arises from the impulse interval 39 between the reflections of beam 10 and beam 15 at the respective first reflector 19.

Figure 8:
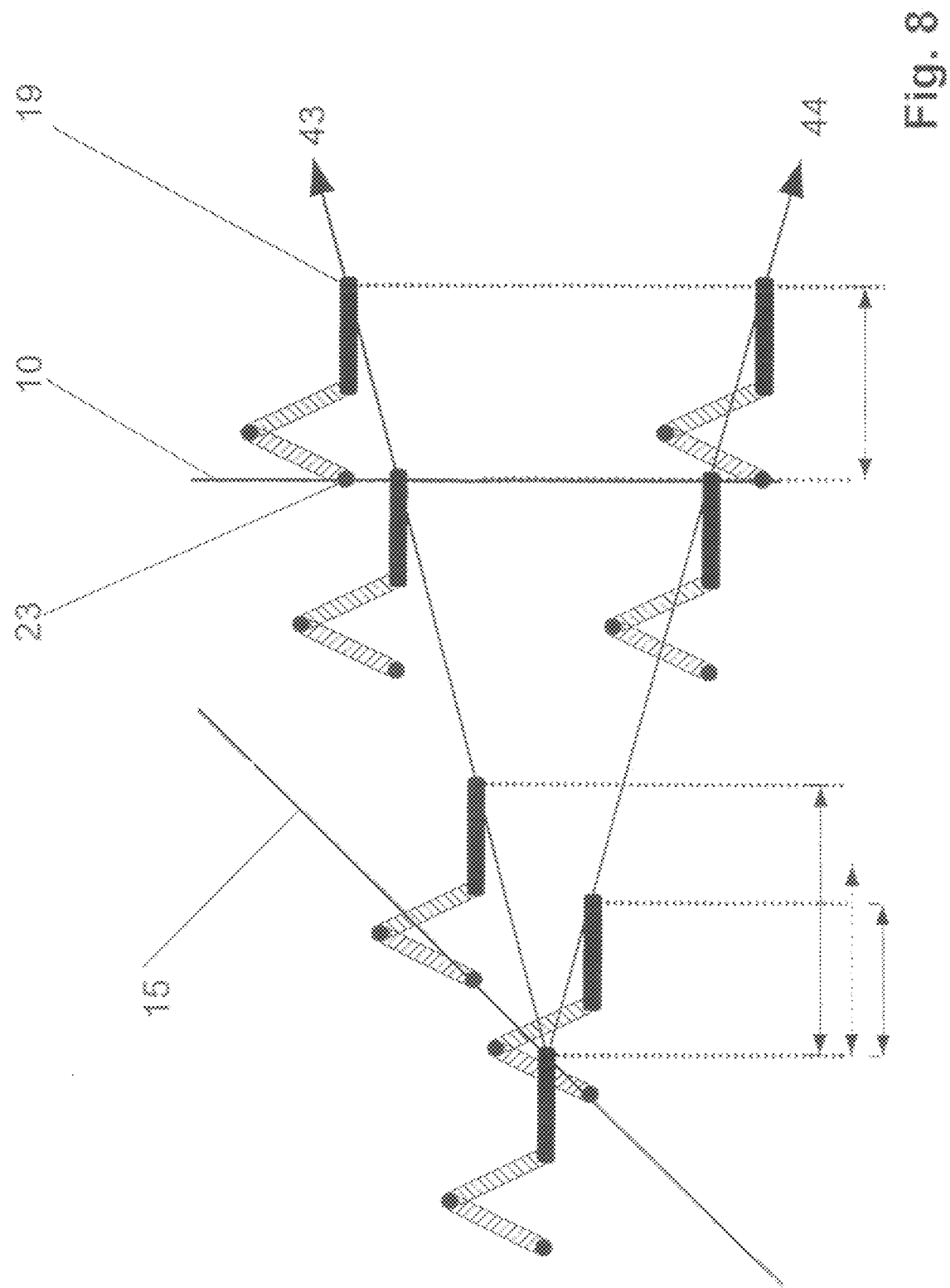
FIG. 8 is a diagrammatic sketch of the sequence of impulses for determining the horizontal angle of approach in/out $A_{io}$ of a golf swing with a low/wide group of reflectors according to FIGS. 1 and/or 3.

FIG. 8 clarifies the measurement procedure to determine the hitting parameter horizontal angle of approach in/out $A_{io}$. In order to simplify the illustration, it was assumed, that the club face angle open/closed $A_{oc}$ equals 0° and that the horizontal angle between the track of the reflector 7 above the out-to-in swing line and the ideal swing path 11 is 15°. Likewise the in-to-out swing line runs at an angle of 15° to the ideal swing path 11 in FIG. 8. The horizontal angle of approach in/out $A_{io}$ is determined from the relative time interval between the reflections at the first reflector 19 and the fifth receptor 23 at the first reflective light barrier 4 by beam 10, and at the first reflector 19 and the fifth reflector 23 at the second reflective light barrier 5 by beam 15. Depending on the horizontal angle of approach in/out $A_{io}$ the impulse sequence at beam 15 of the reflective light barrier 5 shortens in case of in-to-out swing lines 44, as compared to the impulse sequence at beam 10 of the reflective light barrier 4, or they get prolongated in case of out-to-in swing lines 43. This effect is superimposed by effects of $A_{oc}$, which however can be compensated arithmetically.

In order to avoid a laborious manual adjustment of the group of reflectors 7 at the golf club 1 with respect to the distance between the lower edge 71 of the group of reflectors 7 from the playing surface 18, it is advisable to choose always the same reference point for the detachable clamp-connection of the group of reflectors 7 at the golf club 1, namely the transition 70 between the club head 12 and the club shaft 25 for the lower edge 71. However, this varies considerably between drivers, woods, and irons and between different manufacturers.

Figure 9:
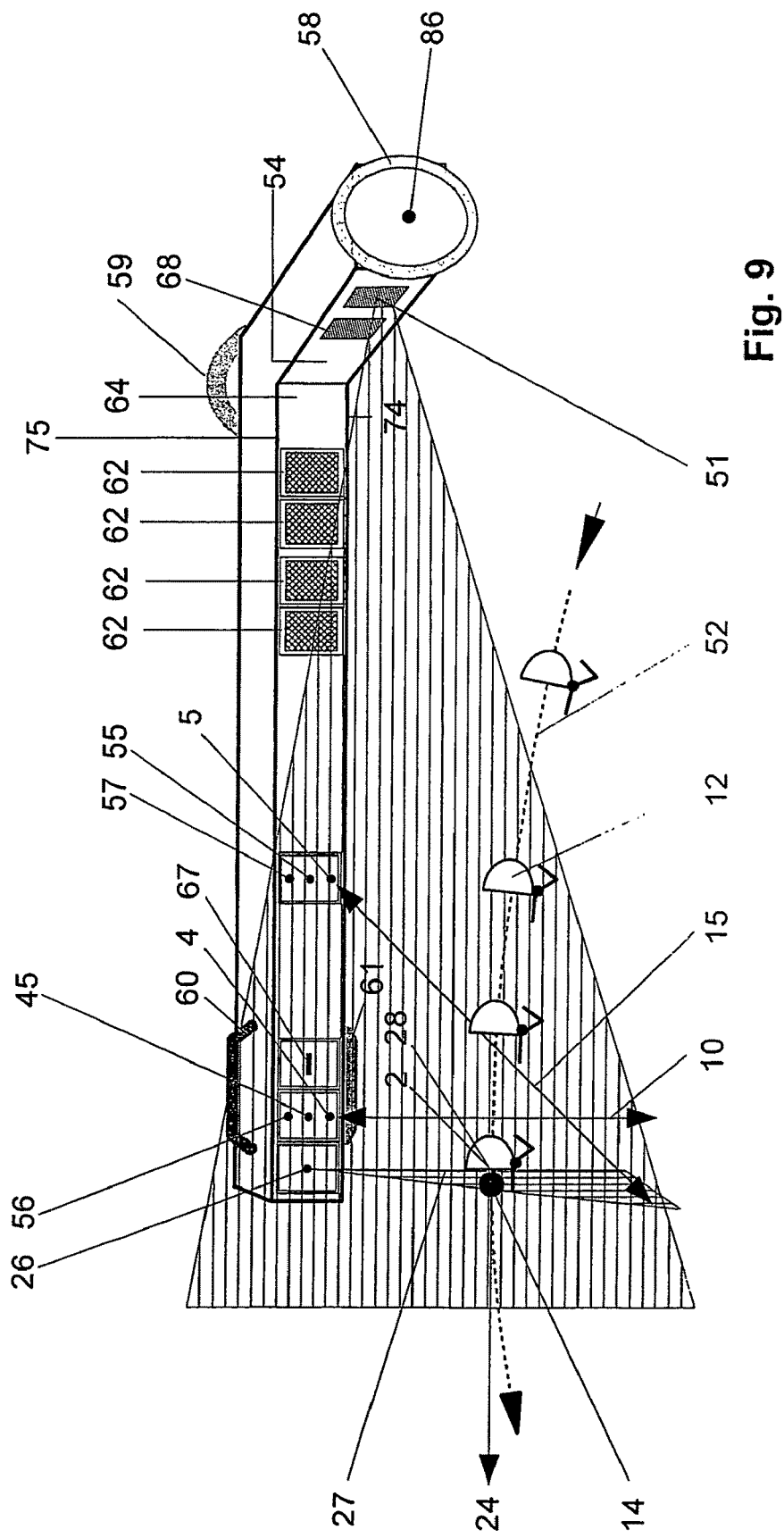
FIG. 9 is a diagrammatic sketch of the measuring system according to the invention in another embodiment for additionally determination of the time course of the club head speed during a downswing, of the performance indicator number for the unleashing of the wrist, of the club head speed at the hitting instant.

Hence in another embodiment of the invention according to FIGS. 6 and 9, an additional third reflective light barrier 45 is implemented above the first reflective light barrier 4, and an additional fourth reflective light barrier 55 is implemented above the second reflective light barrier 5, with both of the additional reflective light barriers being placed exactly in the middle between the upper edge 75 and the lower edge 74 of the side wall 64 in this embodiment. Thus, the first two reflective light barriers 4, 5 can be used preferably for irons and woods with short transition ranges 70. A switch-over to the additional reflective light barriers 45, 55 occurs, where especially drivers with large club heads and correspondingly large transition ranges are used. Similar to beam 10, the beam 78 of the third reflective light barrier 45 points also horizontally and at right angle with respect to the ideal swing path 11 of the club head 12, and the beam 79 of the fourth reflective light barrier 55 points at the same acute angle 16 as beam 15.

It is advantageous to attach the group of reflectors 7 to the club shaft 25 directly above the club head 12, preferably by a snap ring or another type of tight, but detachable clamp-connection. It has further proven to be favorable with respect to stability and risk of injury, to attach the group of reflectors 7 to the club shaft 25 preferably centrally, i.e. near the third reflector 21.

FIGS. 6 and 9 further show an embodiment, in which the measurement device 3 can be used for right- and left-handers. Therefore above the third light barrier 45 a fifth reflective light barrier 56 was arranged in a mirror-inverted way with respect to the first reflective light barrier 4, which for instance takes over the function of the first reflective light barrier 4 in the left-hander operating mode. A further sixth reflective light barrier 57, which is also arranged in a mirror-inverted way above the fourth reflective light barrier 55 takes over the function of the second reflective light barrier 5. An integrated position sensor causes for instance the mirror-imagedly arranged reflective light barrier 56 to take over the function of the first reflective light barrier 4 and the mirror-imagedly arranged reflective light barrier 56 to take over the function of the second reflective light barrier 5. The respective vertical distance of the reflective light barriers 4, 45, 56, and 5, 55, 57 is 3 cm in this embodiment. The mirror inverted mountings may result when the measuring device 3 is designed symmetrically with respect to a horizontal midplane of the measuring device 3.

If the fifth reflective light barrier 56 and sixth reflective light barrier 57 are used to measure the hitting parameter dynamic loft $A_{dl}$, the distance of the vertically staggered first reflective light barrier 4 from the fifth reflective light barrier 56 in the first group of reflective light barriers 4, 45, 56 as well as the distance of the second reflective light barrier 5 from the sixth reflective light barrier 57 in the second group of reflective light barriers 5, 55, 57, should be at least 7 cm.

It is in the scope of this invention to implement additional reflective light barriers to improve the precision of the measurement even further. However, basically, left- and right-hander operation may also be done with the reflective light barriers 4 and 5 only, if these are arranged in the middle between the upper edge 75 and the lower edge 74 of the side wall 64 of the measuring device 3. Left- and right-hander operation is further possible with four reflective light barriers, if the distance to the upper edge 75 and the lower edge 74, respectively, is equal for all reflective light barriers 4, 5, 45, 55. With a higher number of reflective light barriers, the adaptability to the height of the group of reflectors 7 may be improved further.

Figure 10:
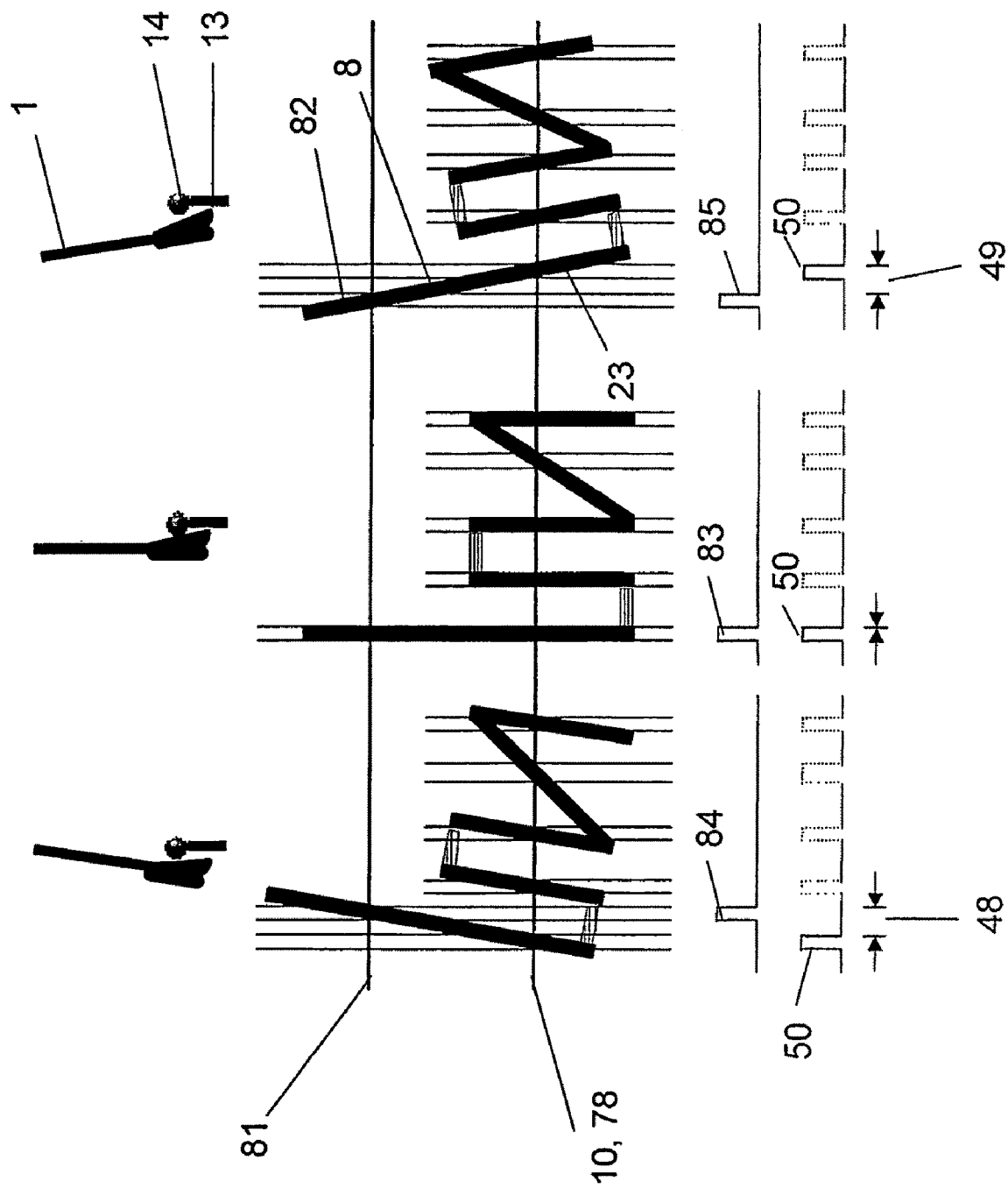
FIG. 10 is a diagrammatic sketch of the sequence of impulses for determining the hitting parameter angle of dynamic loft $A_{dl}$ of a golf swing in another embodiment with a low/wide group of reflectors according to FIGS. 1 and/or 3 and a prolonged fifth reflector.

If the measurement setup according to this invention is also supposed to ascertain the angle of the dynamic loft $A_{dl}$, which indicates, whether at the hitting point 2 the grip end 80 of the golf club 1 is in front of or behind the club face 69, then a further seventh reflective light barrier (not shown) with a beam 81 above the reflective light barriers 4, 45, and 56, respectively, is required. The seventh beam 81 can parallel the first, third, and fifth beams 10, 78, and 65. Since the beam 81 should run preferably about 30 cm above the beam 78 of the third reflective light barrier 45, it is necessary to equip one of the reflectors 19, 21, 23 with an extension 82 of the reflector rod as shown in FIG. 10. The measurement is accomplished with one of the reflective light barriers 4, 45 and 56, respectively, plus the seventh reflective light barrier. If at the hitting point 2, the grip end 80 is located over the club face 69, the hitting point 2 was encountered ideally. The impulse 50 of the first reflective light barrier 4 or of the third reflective light barrier 45, respectively, occurs at exactly the same instant as the impulse 83, that was elicited by the beam 81 of the seventh reflective light barrier. If at the hitting point 2, the grip end 80 is located in front of the golf ball 14, the impulse 84 of the beam 81 is sent advanced with respect to the impulse 50 by the interval 48. If at the hitting point 2, the grip end 80 lags behind the golf ball 14, the impulse 85 of the beam 81 is sent lagging behind the impulse 50 by the interval 49.

The club head 12 is closest to the hitting point 2, if the extension of the reflector rod is mounted to the fifth reflector 23. If it is mounted to one of the other reflectors 19, 21, a correction factor must be accounted for by the issued value.

Alternatively, instead of the extension of the reflector rod 82, a retroreflective surface 8 may be tagged directly to the club shaft 25 above the group of reflectors 7.

Figure 11:
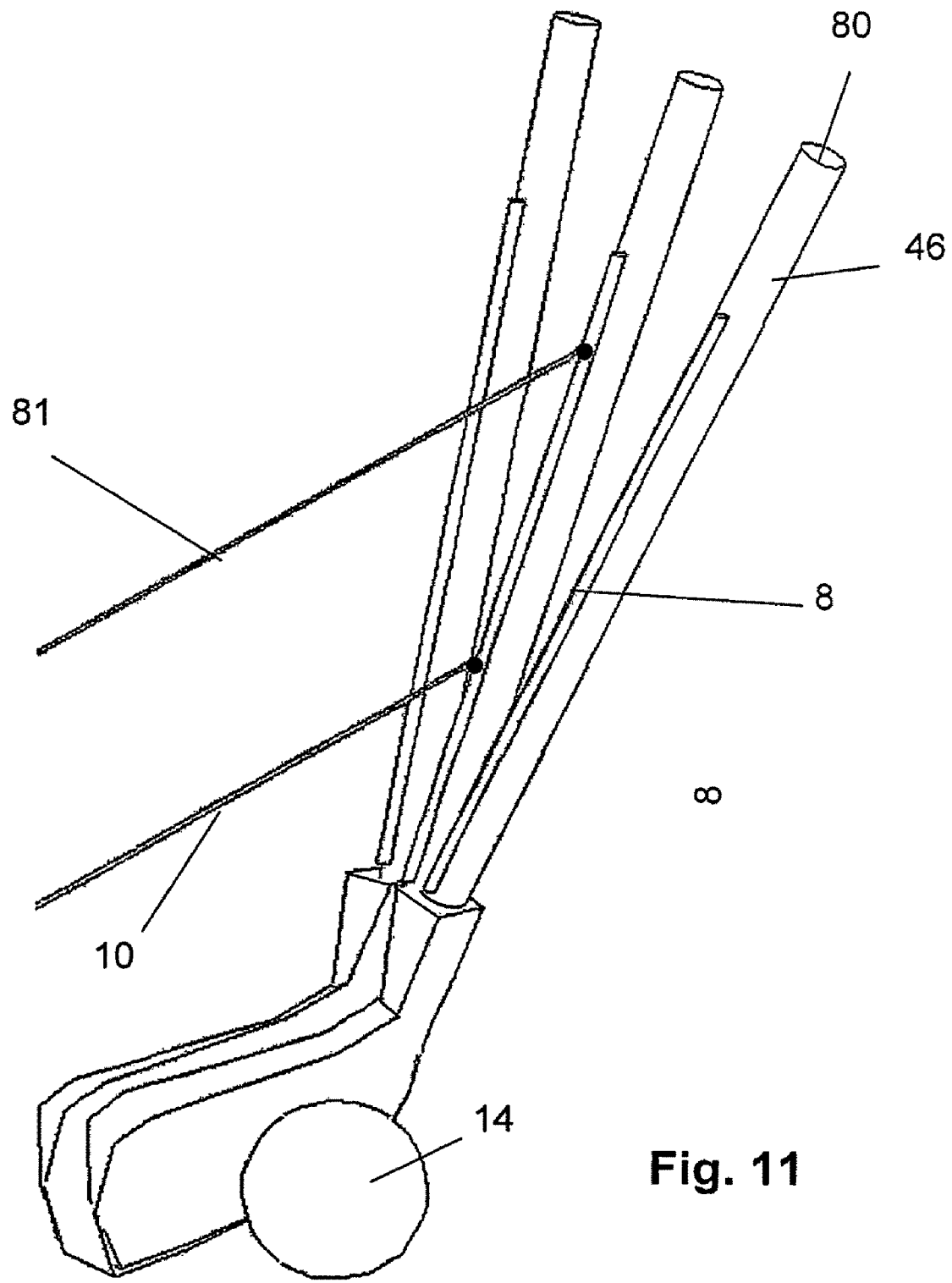
FIG. 11 shows a golf club in another embodiment for measuring the hitting parameter angle of dynamic loft $A_{dl}$ without a group of reflectors.

If exclusively the dynamic loft $A_{dl}$ is to be measured as the only hitting parameter, the measurement can also be performed as shown in FIG. 11, completely without the group of reflectors 7, by tagging the retroreflective surface directly to the club shaft 25.

The seventh reflective light barrier (not shown) may be implemented with a folding mechanism that is hidden in the upper side 73 and/or lower side 74 of a main body of the measuring device 3. Alternatively, the seventh reflective light barrier (not shown) may be erected as an additional or accessory part by a plug- and socket connection (not shown) so that the accessory is attached to a main body of the measuring device 3 by a plug-type connector.

All applied reflective light barriers 4, 5, 45, 55, 56, 57 preferably are fast responding laser-reflective light barriers and their beams 10, 15, 78, 79, 65, 66, 81 high frequency amplitude-modulated pulsed light beams, preferably laser beams. The higher the frequency of the laser beams, the better is the precision of the measurements.

In another embodiment according to FIG. 9 the measurement device 3 is designed L-shaped. Into the front face of the transverse wall 54, a radar transceiver 51 is integrated, which points horizontally towards the golf ball 14 and/or tee, and which additionally measures in coaction with the first reflective light barrier 4 and in interaction with a reflector, preferably with the fifth reflector 23, the hitting parameter club head speed in an alternative way. Both measurement results are compared to each other. In case of minor differences, corrections are performed by the program, and in case of major deviations the golfer 9 is prompted to calibrate the golf club 1 and the corresponding group of reflectors 7, with an easily to use calibration appliance which is attached directly to the measuring device.

The radar transceiver 51 is preferably, a high speed radar transceiver (24 GHz band) which measures by Doppler frequency analysis the club head speed as function of time while the club head 12 sojourns in the reach of the radar beam 53 or the radar lobe, respectively. By integration of this speed vs. time course in relation to the time of the moment of the impulses of the first group of reflective light barriers 4, 45, 56, the progress of the club head position as a function of time may be calculated. The information and storage output unit 17 can exploit a temporal relation to pulses of the first, third, and fifth reflective light barriers 4, 45, and 56 formed from the reflectors 7 or 7a and thereby calculate the club head speed as a function of a position of the club head 12.

All measurements of the measuring system according to this invention are initiated when one of the reflective light barriers 4, 5, 45, 55, 56, 57 is activated. This might, for instance, result from the so called "waggling". In this procedure, the golfer 9 swings the golf club slightly back and forth in order to loosen up and to find the proper swing posture. Since these movements take place at a club head speed of <15 km/h, whereas the first measured type of swing should be a so called chip (short swing), which is accomplished at 20-40 km/h, the solution to the problem according to the present invention is to scan the radar Doppler signal at short intervals of e.g. 5 ms by Fourier analysis for the occurring frequencies in order to determine the speed and direction of the movement of the club head. For this purpose the measuring device 3 is equipped with a microprocessor or signal processor (DSP) for triggering the actual measurement. The microprocessor or signal processor (DSP) calculates the club head speed of the club head. The high speed radar transceiver 51 detects or distinguishes by Doppler radar analysis and by an inphase/quadrature phase mixer the pendulum motion or oscillating movements of the golf club 1 and a direction of movement during the preparatory stage of the golf swing and the direction and it starts the measurement procedure only when the club head speed exceeds a preset speed during the downswing of the golf club.

It is within the scope of this invention that these calculations may be performed by the information output- and storage unit 17 rather than by a microprocessor.

In the embodiment according to FIG. 9 the measuring device 3 is equipped with wheels 58, 59 at its transverse axis 86 and with handles 60, 61, one above and one below the longitudinal axis 63 near the optical line laser 26. The handles serve both as handholds and as supporting stands, respectively, as predetermined by the right- or left-hander mode, with the height of the handles together with the diameter of the wheels ensuring the horizontal position or orientation of the measuring device 3.

By lifting the measuring device 3 with the handle 60, turning it over the wheels 58, 59 and depositing it on the handle 60, the measuring device 3 may be converted in a device for left-handers, whereupon preferably an additional fifth reflective light barrier 56 takes the role of the first reflective light barrier 4 and an additional sixth reflective light barrier 57 takes the role of the second reflective light barrier 5. It is within the scope of this invention that the information output- and storage unit 17, e.g. a laptop, or a battery that is integrated into the transverse wall 54, may supply the measuring device with power, if no external power outlet is available.

Additionally, the embodiment according to FIG. 9 contains in the side wall 64 of the measuring device 3 a plurality of e.g. optically or capacitively operated switches 62 which can be activated with the club head, and which may e.g. allow for starting, i.e. launching, or resetting of a program of the information output- and storage unit 17 by the club, without that the player 9 has to operate the PC or laptop manually or has to bend down.

Figure 12:
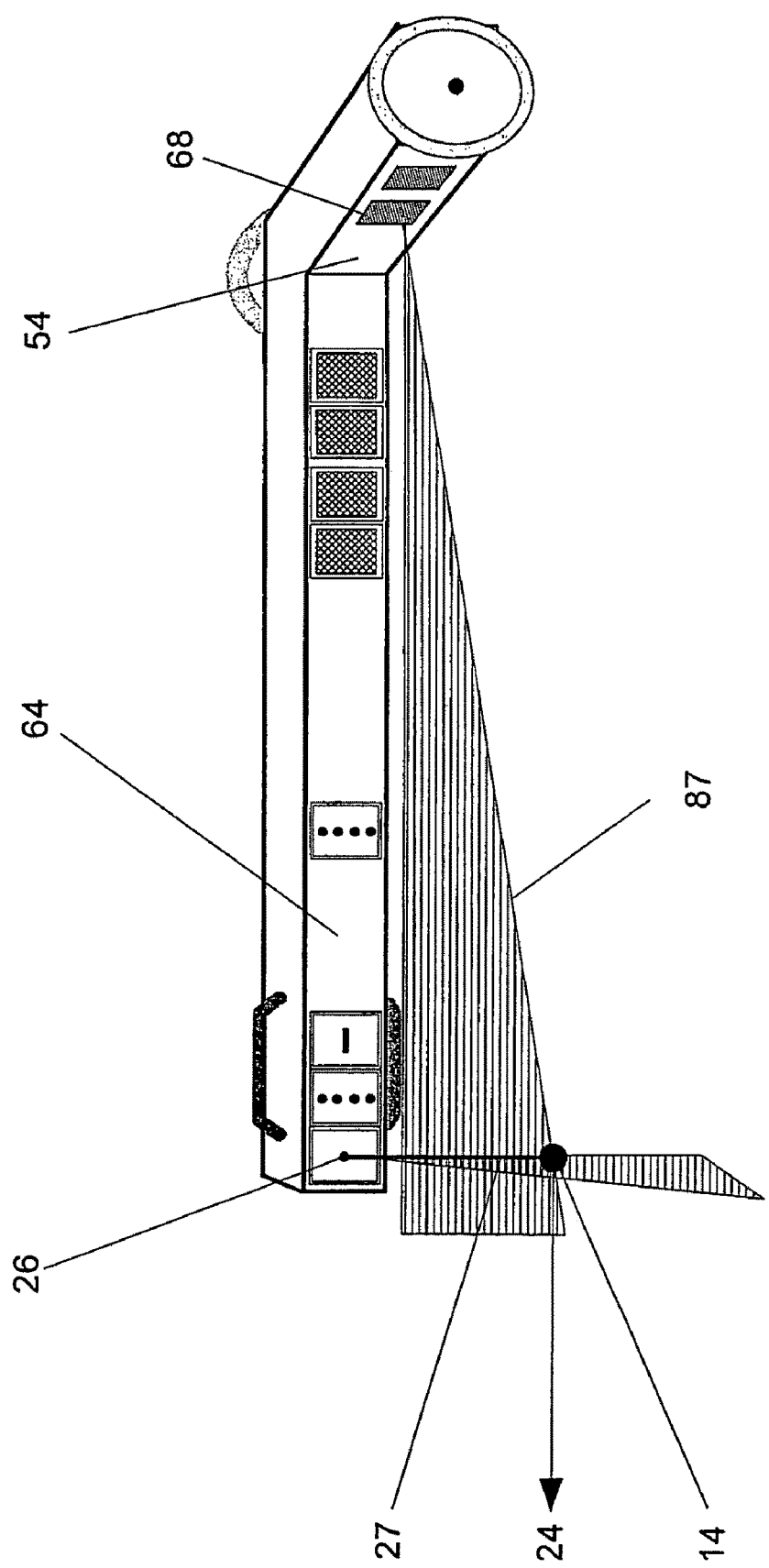
FIG. 12 is a diagrammatic sketch of the measuring system according to the invention in another embodiment for the precise placement of the golf ball.

In another example of embodiment according to FIG. 12 it is disclosed how an exact placement of the golf ball 14 or of the tee 13, respectively, namely the longitudinal and latitudinal orientation may be achieved. For this, an additional second line laser 68 was placed in the front face of the transverse wall 54. This laser sends a line-shaped beam 87 at an angle ≦45° to the golf ball 14. When the beam 27 of the optical line laser 26 crosses the beam 87 on the golf ball 14 or on the tee 13, the golf ball 14 or the tee 13 is placed properly. This kind of orientation is more precise and faster than the orientation with the help of only one optical line laser 26 on the surface 28 of the golf ball 14 and a tool for measurement of lengths. If the golf ball has to be adjusted also in its height because no tee is available, e.g. in the practice mat of a driving range, it is advantageous to replace one of the line lasers by a multi line laser.

Figure 13:
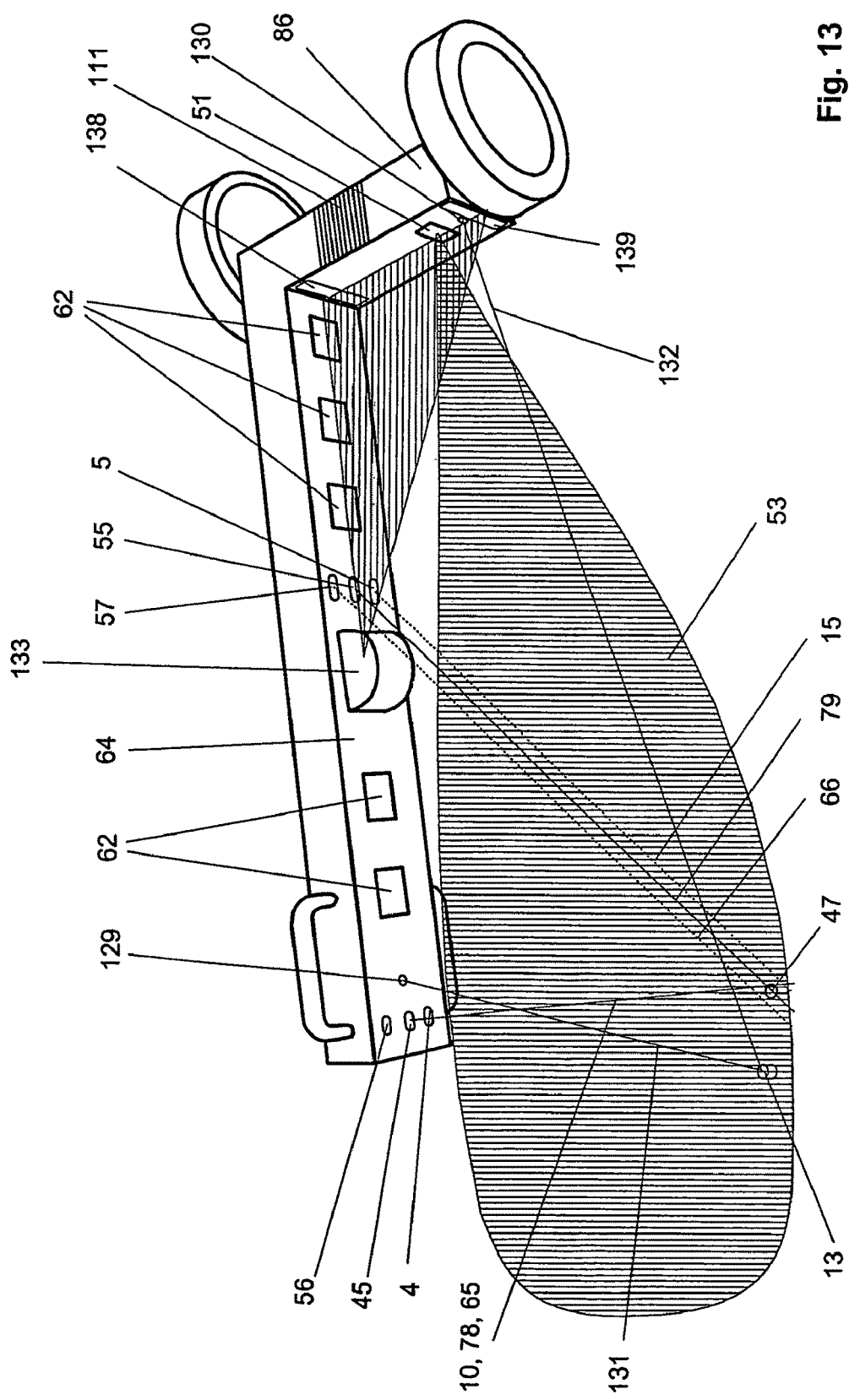
FIG. 13 is a diagrammatic sketch of another embodiment of the measuring system with a calibration appliance according to the present invention.

In the embodiment according to FIG. 13 a measurement setup is shown, in which the tee 13 was placed ahead of the measurement device 3. This offers the golfer more clearance for conducting the swing. Concomitantly, for an exact electronic orientation of the measuring device 3, adjustment lasers 129, 130 are placed at the front side wall 64 and at the front face of the cross side wall 54, respectively. Their beams 131, 132 cross at a templet that is put over the tee 13 and on which a calibration line is marked, when the measuring device 3 is in the proper position for exact measurements. In this embodiment, too, the reflective light barriers of the first group of light barriers 4, 45, 56 are arranged at an angle of 90° in the side wall 64 and their horizontal beams 10, 78, 65 paralleling each other and the playing surface, point to the group of reflectors 7, 7a above the tee-point 47 for playing without ball.

The reflective light barriers of the second array of reflective light barriers 5, 55, 57 are preferably arranged at an angle of 45° in the side wall 64 and their horizontal beams 15, 79, 66 which parallel each other and the playing surface, cross the beams 10, 78, 65 of the first array of reflective light barriers 4, 45, 56 maximally 10 cm behind the tee-point 47 and behind the ideal swing path 11.

Seen from a right-handed golfer 9 when the measurement system is arranged such that the measurement device is opposite the golfer, the tee 13 is placed left from the potential tee or lie point 47 at a distance which corresponds to at least half the width of the group of reflectors 7, 7a, and when the reflectors 7, 7a are attached to the shaft of the golf club, the club head 12 hits the golf ball 14 that lies on the tee 13, immediately after the group of reflectors 7, 7a has left an area or region of the first, third, and fifth beams 10, 78, 65 of the first array of reflective light barriers 4, 45, 56.

With a measurement device according to FIG. 13 the hitting parameters club face position angle open/closed $A_{oc}$, hit the sweet spot (horizontal and vertical deviation), and dynamic loft $A_{dl}$ can further be measured with a high/narrow group of reflectors 7a according to FIGS. 14 to 16 which is also within the scope of this invention. This group of reflectors 7a gets by with three reflectors 97, 98, 99, but requires at least two reflective light barriers of the first array of reflective light barriers 4, 45, 56 and at least two reflective light barriers of the second array of reflective light barriers 5, 55, 57, instead. In the high/narrow group of reflectors 7a, the first reflector 97 and the second reflector 98 are of different length. Both reflectors run vertically and parallel each other, but are arranged in different planes. The third reflector 99 is attached with its lower end 101 preferably to the lower end 96 of the first reflector 97 at an acute angle. The second reflector 98 is offset backwards from the plane of the first and third reflectors 97, 99. Via a bar 91 the lower end 103 of the second reflector 98 is fixed to the upper end 105 of the third reflector 99 at a well defined distance. The upper end 107 of the first reflector 97 is connected in a reinforcing, stabilizing way to the upper range 109 of the second reflector 98 with the angled ligaments 92, 93. The angled ligaments 92, 93 may also constitute integral parts of a triangular or rectangular plate.

It is within the scope of this invention that the second reflector 98 is offset forward from the plane of the first and third reflectors 97, 99.

It is further within the scope of the present invention that one reflector, namely the first reflector 97 or the second reflector 98 of the high/narrow group of reflectors 7a may be replaced by a retroreflective strip 8, that is directly adhered to the club shaft 25 at a well defined distance to the other two reflectors 97, 99 or 98, 99.

The group of reflectors 7, 7a consists of an inherently, intrinsically, stable carrier or basic body of metal sheet or of thin carbon strips or of another material that is resistant to deformation and bending at speeds of up to 230 km/h and which produces only a minor, negligible additional aerodynamic drag during the swing of the golf club 1. They are mounted by a captive clamping fixture that can provide a captive, skid-proof, but detachable attachment to the club shaft 25 above the club head 12. The distance of the lower edge 71, 96, 101 of a group of reflectors 7, 7a from the playing surface ought to be approximately 1 cm plus the height of a golf ball 14 plus the height of a long tee 13 in order to ensure that the group of reflectors 7, 7a cannot get damaged, even in cases of too lowly conducted swings.

Figure 17:
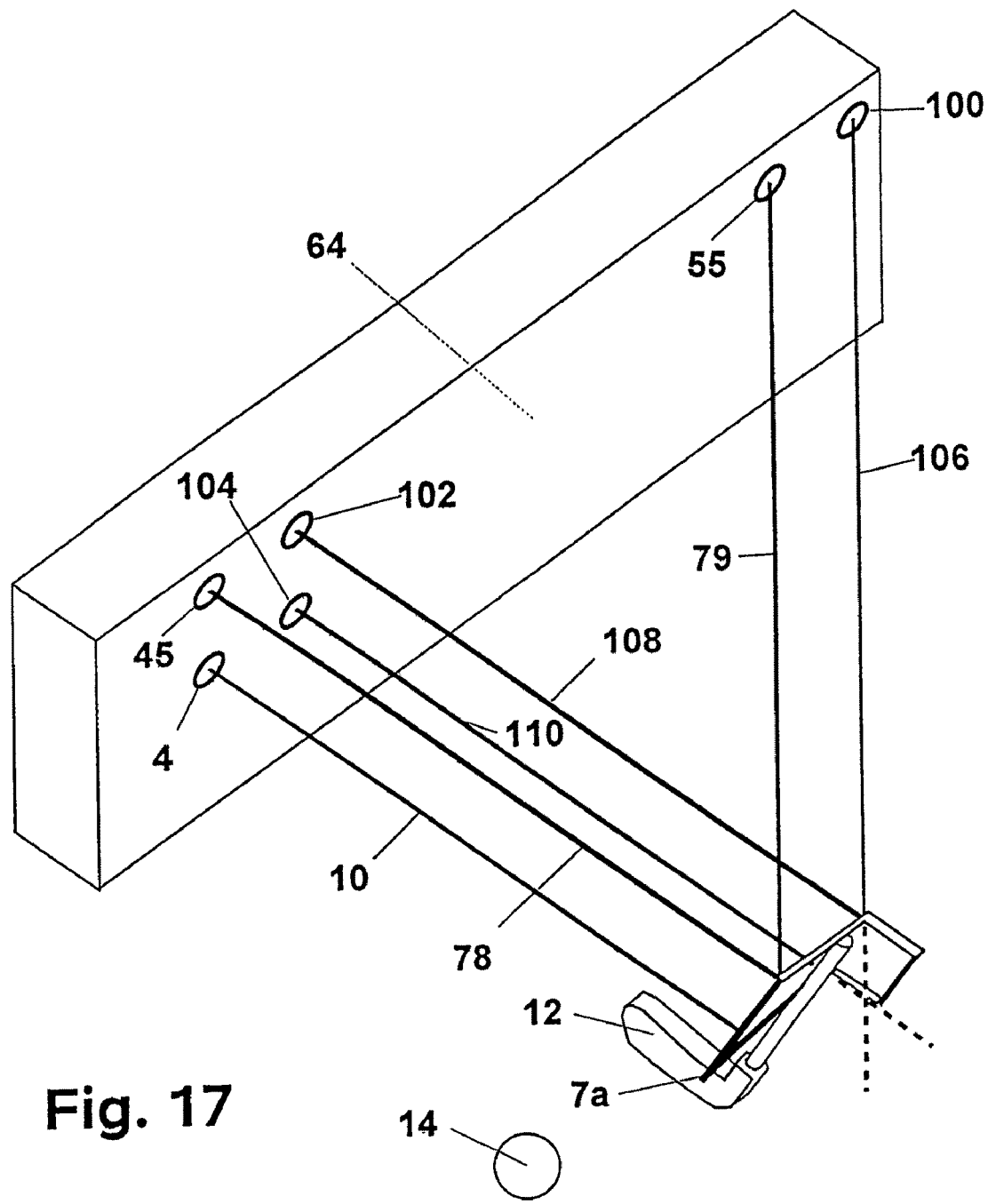
FIG. 17 is a highly simplified diagrammatic sketch of the measuring system according to the invention in another preferred embodiment for measuring the hitting parameters with a high/narrow group of reflectors according to the invention and according to FIGS. 14, 15 and 16.

In comparison to the low/broad group of reflectors 7 according to FIGS. 2 and 3, the high/narrow group of reflectors 7a according to FIGS. 14 to 16 has the advantage, that, because it has only half the width, the hitting parameters can be measured closer to hitting point 2 of the golf ball 14. The relocation of the obliquely downward-running third reflector 99 to the lower section allows even in the case of very big club heads a lower placement of the group of reflectors 7a at the club shaft 25. Advantageous for such a high/narrow group of reflectors 7a is a measurement setup according to FIG. 17, that allows also for measurements of the hitting parameter horizontal angle of approach in/out $A_{io}$ and more precise measurements of the club head speed V.

A measurement system, that can measure all hitting parameters in case of the use of a high/narrow group of reflectors 7a according to FIGS. 14 to 16, is equipped with minimally six reflective light barriers 4, 45, 55, 100, 102, 104. An embodiment of such a measurement setup is shown as highly simplified diagrammatic sketch in FIG. 17. In the side wall 64 of the measuring device 3, there are at right or left of the first reflective light barrier 4, an eighth reflective light barrier 104 pointing with its beam 110 at an angle of 90°, and beside the third reflective light barrier 45, above the eighth reflective light barrier 104 and as well pointing with an angle of 90°, a ninth reflective light barrier 102. Right or left of the fourth reflective light barrier, there is a tenth reflective light barrier 100 directed at an angle of 45°. A lateral distance can exist between the first and eighth reflective light barriers 4 and 104, between the third and ninth reflective light barriers 45 and 102, and/or between the fourth and tenth reflective light barriers 55 and 100 that corresponds to a width of the reflectors 7, 7a or to twice a width of the reflectors 7, 7a.

On execution of an ideal golf swing, the beam 106 of the tenth reflective light barrier 100 and the beam 108 of the ninth reflective light barrier 102 encounters approximately simultaneously the first reflector 97 in its upper third; at the same time, the beam 110 of the eighth reflective light barrier 104 encounters the reflector 97 on its lower third, with each of the reflective light barriers 100, 102, 104 eliciting an impulse. While the group of reflectors 7a moves further towards the golf ball 14, the beam 110 encounters the third reflector 99 in its middle range. Little later the beam 79 of the fourth reflective light barrier 55 and the beam 78 of the third reflective light barrier 45 encounter approximately simultaneously the first reflector 97 in its upper third. Shortly thereafter the beam 10 of the first reflective light barrier 4 passes the third reflector 99 in its middle range and about at the same time the beam 106 of the tenth reflective light barrier 100 the backwards offset second reflector 98 about at half of the height of its longitudinal extension. Finally, the beam 79 of the fourth reflective light barrier 55 and the beam 78 of the third reflective light barrier 45 pass almost concurrently the second reflector 98 at half of the height of its longitudinal extension. Now the club head strikes the golf ball 14. The obtained impulses are interpreted analogously to the temporal patterns described in FIGS. 4, 5, 7, 8, and 10.

If, for instance, upon the evaluation of the vertical deviation from the sweet spot, the golf club 1 is conducted too high, in a way that the golf ball 14 gets "topped", then the interval of the pulses, that the first straight reflective light barrier 4 reflects upon passing of the first reflector 97 and of the third reflector 99, is shorter than if the golf swing would have been conducted too low. The same holds for the eighth reflective light barrier 104.

If, upon the evaluation of the horizontal deviation from the sweet spot, the golf club is conducted too much interiorly, then the impulses of the upper straight third reflective light barrier 45 and of the ninth reflective light barrier 102 come about later than the impulses of the upper oblique fourth reflective light barrier 55 and of the tenth reflective light barrier 100. Inversely, if the golf club is conducted too much outside, the impulses come about early.

In case of a closed golf swing ($A_{oc}$) the pulse intervals of the upper reflective light barriers 45, 102, 55, 100 are prolongated, those of an open conducted swing are shortened. The pulse intervals of the of the pulse-pairs of the lower straight reflective light barriers 4, 104 get shortened only by the cosine of the open- or close angle and hence they are barely changed.

In the determination of the hitting parameter horizontal angle of approach in/out ($A_{io}$), with out-to-in conducted swings, the intervals of the impulses from the same reflectors are longer at the oblique reflective light barriers 55, 100 than at the straight reflective light barriers 45, 102. In an in-to-out conducted swing, the intervals of the impulses from the same reflectors are shorter at the oblique reflective light barriers 55, 100 than at the straight reflective light barriers 45, 102. The complete pulse trains of the lower straight reflective light barriers 45, 104 are shortened only by the cosine of the out-to-in or in-to-out angle and hence change barely.

In the determination of the hitting parameter dynamic loft $A_{dl}$, in case of a dynamically increased loft, the impulses if the lower first reflective light barrier 4 antecede those of the upper third reflective light barrier 45 and of the fifth reflective light barrier 56. In case of a dynamically diminished loft, the impulses lag behind.

The dynamic lie can also be determined with a measurement setup according to the invention. Conditions are a measurement device (3) according to FIG. 9 with at least four reflective light barriers, whereas two reflective light barriers 4, 56 are aligned at an angle of 90° and two reflective light barriers 5, 57 are arranged at an angle of 45° and a parallel to the club shaft 25 arranged group of reflectors according to FIG. 3 or FIGS. 14 to 16. As with the sweet spot (horizontal) measurement, this allows to determine during the current swing the distance of the reflecting spots on the group of reflectors 7 from the side wall 64. This distance is determined at minimally 2 height levels by at least two pairs of reflective light barriers, whereas the first pair of reflective light barriers comprises for instance of the first reflective light barrier 4 and the second reflective light barrier 5 and whereas the second first pair of reflective light barriers comprises for instance of the fifth reflective light barrier 56 and the sixth reflective light barrier 57. From the difference of the distances that are determined by the two pairs of reflective light barriers 4, 5 and 56, 57 and the known height difference of these pairs of reflective light barriers 4, 5 and 56, 57, the inclination of the group of reflectors 7 and thereby of the club shaft 7 from the vertical can be determined. Thus, with the help of the previously for instance by calibration determined static lie angle of the respective golf club 1, the dynamic lie of the analyzed swing can be determined.

The group of reflectors 7, 7a should have a height, that ensures, that all reflectors 19, 20, 21, 22, 23, 97, 98, 99 can reflect utilizable impulses or that for a badly accomplished golf swing in case of a low/wide group of reflectors 7 minimally four pulses and in case of a high/narrow group of reflectors 7a minimally six pulses are available for evaluating the hitting parameters.

It is also in the scope of this invention, that a performance indicator number for the unleashing of the wrist is shown on the information output- and storage unit 17. The performance indicator number for the unleashing of the wrist characterizes the jerkily shortening of the line outer edge of the little finger—elbow or the jerkily opening of the angle between the club shaft and the left forearm (right-handers), respectively, immediately before or at the hitting moment. A large performance indicator number for the unleashing of the wrist indicates a significant acceleration during the final stage of the golf swing and a high club head speed in the hitting point 2.

It is also in the scope of this invention, that upon arrival at the hitting point 2, one of the reflective light barriers 4, 45, 56 emits or issues an impulse for further externally connected analysis devices. An issued impulse may for instance trigger or start or synchronize a video camera (not shown), that determines the vertical angle of approach as a further hitting parameter. Its advantage is the enabling of a concomitant synchronous bodyposture analysis.

The measuring device according to the present invention operates with up to six reflective light barriers with a current consumption of approx. 20 mA each. Therefore the whole setup may for instance also be fed by the 5-V-voltage of the USB-bus from the evaluating computer.

The low number of reflective light barriers makes the proposed setup cheaper than the one disclosed in the prior art, even of one takes into account, that laser reflective light barriers are more expensive than e.g. infrared reflective light barriers.

The angle of beam spread of the laser reflective light barriers is negligible at the regarded distances (<1 m). Because of this small beam aperture of the laser reflective light barriers, the measurement setup according to the invention could be designed without loss of temporal/spatial resolution in a way, that the retroreflective strips can be "read out" over a distance of approx. 0.5 m. Hence, even with massively miscarried golf swings, a collisions of golf club and measuring device must barely be expected. At the worst a breakage of the cheap group of reflectors attached to the club shaft may occur.

Another advantage of the present invention consists of the fact, that even at a working distance of approx. 0.5 m, the bright spots of the used laser reflective light barriers have only approx. 2 mm ø. Even if these bright spots happen to strike reflective surfaces of the club heads or -shaft, there is only a extremely low likelihood, that these surfaces reflect the light back to the receiver of the light barrier.

The present invention makes use of a special arrangement of reflectors, with which the coordinates of the club with respect to the sweet spot and the open/close angle are obtained by integration over a distance of approx. 6 cm. Hence the measurement duration is somewhat above 2 ms at 100 km/h. The temporal resolution is 6 μs. Therefore at 100 km/h the limit of the resolution for the way that results from the temporal resolution is $$0.000006 \text{ s} \cdot 0.27.7 \text{ m/s} = 0.167 \text{ mm}$$

The effective limitation of the system accuracy results also from variations in the laser beam diameter (on average approx. 2 mm) and is in practice <0.2 mm at 100 km/h.

In the present invention, an increase of the offset of the fourth reflector of the low/wide group of reflectors or of the second reflector of the high/narrow group of reflectors for goniometry from the plane of the other reflectors, can in principle arbitrarily increase the angular resolution (at the expense of the measuring range). At practicable offsets in the range 30 mm to 60 mm, angular resolutions in the range of $$\arcsin\left(\frac{0.2 \text{ mm}}{30 \text{ mm}}\right) = 0.38°$$
$$\text{to}$$
$$\arcsin\left(\frac{0.2 \text{ mm}}{60 \text{ mm}}\right) = 0.19°$$

were obtained.

In a further embodiment of this invention are the reflective light barriers 4, 5, 45, 55, 56, 57 not arranged as compact units directly in the side wall 64 of the measurement device 3. The reflective light barriers 4, 5, 45, 55, 56, 57 may send their beams 10, 15, 65, 66, 78, 79, 81 via optical fibers to the defined arranged respective apertures in the side wall 64.

The ends of the optical fibers are fixed in the defined arranged respective apertures in the side wall 64 which match the diameters of the optical fibers, in a way that the beams 10, 65, 78, 81 of the first, third, fifth, and if applicable of the seventh reflective light barriers 4, 45, 56 exit the optical fibers at right angle and the beams 15, 66, 79 of the second, fourth and sixth reflective light barrier 5, 55, 57 at an angle of 45° with respect to the ideal swing path (11) of the club head (12) near the tee (13) and/or the golf ball (14). Optionally, a separate optical fiber is allocated to the each of the receivers of the reflective light barriers 4, 5, 45, 55, 56, 57, so that minimally two optical fibers such as a first optical fiber and a second optical fiber are arranged in each aperture of the defined arranged respective apertures. Alternatively, the receivers of the reflective light barriers 4, 5, 45, 55, 56, 57 are arranged in the side wall 64 adjacent to or in the apertures for the optical fibers of their respective transmitters.

Pertaining to the invention, on the retroreflective surfaces 8 of the group of reflectors 7, 7a, during the passage, the beams 10, 15, 65, 66, 78, 79, 81 elicit temporally staggered pulse shaped measurement data. If implemented, the respective second optical fiber transmits the pulses to the respective receiver of the reflective light barriers 4, 5, 45, 55, 56, 57, or alternatively, the respective receiver of the reflective light barriers 4, 5, 45, 55, 56, 57 senses directly the pulses and subsequently transfer them to the data acquisition system where the data are processed according to the invention.

Using optical fibers and matching the intensity of the light signals allows to reduce the numbers of the light transmitters of the reflective light barriers. Ideally, a single light transmitter with a plurality of optical fibers may be used instead of one individual light transmitter for each of the reflective light barriers 4, 5, 45, 55, 56, 57. The number of receivers cannot be reduced with conventional technology, because else the pulses might superimpose to each other. A number of the light transmitters may be smaller than the number of reflective light barriers. For example the number of the light transmitters may be smaller than six.

It is also in the scope of this invention that the measuring device 3 or the whole measurement system pertaining to the invention may be arranged stationarily and theft-proof in the paneling of a wall, for instance in a partition wall of a driving range. The transverse axis 86 may be brought to the position needed for playing by a folding or retractable mechanism.

Another advantage of the present invention is, that no electronically active components are attached to the club. This abolishes the necessity for an energy source at the club, which is needed to operate laser sensors or a radio link as disclosed in the state of the art.

Exact measurement results can only be achieved, if the measurement setup is exactly calibrated. As described above, the calibration of the position of the measuring device 3 with respect to the position of the golf ball 14 and/or the tee 13 on the playing surface 18 is achieved by an optical line laser 26 and/or with help of the adjustment lasers 129, 130 that are arranged in the side wall 64 or the cross side wall 86.

It is in the scope of this invention to arrange the measuring device 3 and the tee point 47 for the golf ball 14 and/or the tee 13 at precise positions on a specially designed dedicated practice mat that is delivered together with the measuring device 3 to calibrate in this way. For instance fixed stops may be arranged in the practice mat and in the lower side 74 of the measuring device 3.

Suited as such fixed stops are for instance studs which engage exactly in complementary indentations of e.g. eyelets, rings, troughs, hollow rivets or holes and prevent shifting of the measuring device. Likewise latching by magnets is possible. The arresting points or the tee position 47 for play with and without golf ball may be arranged at different positions on the practice mat.

Prior to the first measurement with another golf club 1 and if the measurement device 3 prompts to do so, the golf club 1 and the group of reflectors 7, 7a attached to it must be calibrated, because without special tools it is not possible to arrange the group of reflectors 7, 7a at an exact distance to the playing surface 18 and at an angle of exactly 90° with respect to the club face 69. For this calibration the measuring principle is inverted. This means that during the calibration the laser and/or the laser beam moves, while the golf club 1 is totally at rest.

In a first embodiment the club head 12 is placed in a well-defined position at a calibration device (not shown) and the position of the group of reflectors is scanned by an amplitude-modulated laser beam that is moved by a turning mirror, by directing with another reflective light barrier (not shown) via the slot 67 according to FIG. 9, a determinedly moving the laser beam towards the calibration appliance. The response pattern of the group of reflectors 7 further makes it possible to detect a potential decalibration and to communicate the deviation to the information output- and storage unit 17.

Figure 18:
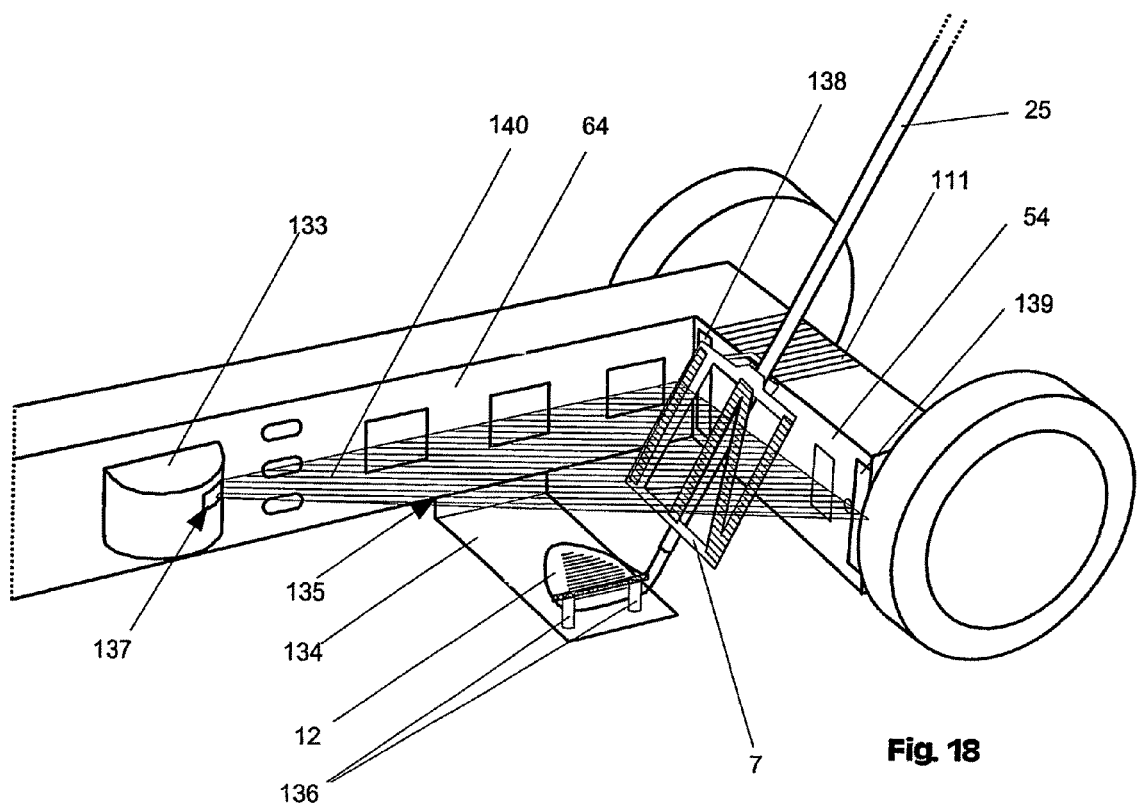
FIG. 18 is a diagrammatic sketch of the calibration appliance according to the invention placed in the measuring system according to the invention according to FIG. 13.

A calibration setup according to the invention is shown in FIG. 18. The coordinates and the direction of a group of reflectors 7, 7a with retroreflective surfaces 8 can be calculated, if the relative position of the club head and concomitantly of the sweet spot in relation to the group of reflectors 7, 7a, are known. The calibration setup for measuring angular deviations of a group of reflectors 7, 7a that is attached to the club shaft 15 if a golf club 1 at right angle with respect to the club face 69 of the club head 12 consists of a calibrator 133 with minimally one rotating reflective light barrier 137, a mechanical adjusting device 134, placed at a well defined distance from the calibrator 133, whereupon the adjusting device 134 is equipped with a stop 136 for the club face 69 of the club head 12, and minimally two reflectors 138, 139 with retroreflective surfaces 8, which are placed behind and at some lateral distance to the right and to the left from the group of reflectors 7, 7a that is to be calibrated.

Such a calibration device is integrated into the measuring device 3. The calibrator 133 is placed about centrally in the side wall 64 of the measuring device 3. The adjusting device 134 is placed approx. in the middle between the calibrator 133 and the front face of the cross side wall 54 and is engaged in a catch at a defined position at the lower side of the measuring device 3 where it is mounted in a skid-proof way. Two reference reflectors 138, 139 of the calibration setup are placed undetachably to the respective ends of the front face of the cross side wall 54.

The beam aperture of the rotating reflective light barrier 137 is <0.1° to 0.20 and its beam 140 oscillates one or several times with a rotating movement of constant angular velocity between the two reference reflectors 138, 139. With a bedstop 136 on the adjusting device 134 and an optical adjustment aid 111 of lines on the top wall of the transverse axis 86, the club face 69 and the club shaft 25 are aligned at an angle of 90° with respect to the group of reflectors 7, 7a, which is optimally attached to the club shaft 25. Nevertheless, in the process of fastening to the club shaft 25, the group of reflectors 7, 7a is only coarsely aligned by visual judgment. During the calibration process, the receiver of the calibrator 133 gets measuring data from the reflected rotating beam 140 about the reflectors 19, 20, 21, 22, 23, 97, 98, 99 of the group of reflectors 7, 7a, and transmits these scanned data to the data acquisition unit 6 and to the information output- and storage unit 17, in which the processing of the measurement data and the matching of the calibration data with the data during the golf swing takes place. From these data, the distance of the group of reflectors from the sweet spot in all three Cartesian translational degrees of freedom and the real angle of tilt around the vertical axis are identified. This evaluation requires the reflection of the two reference reflectors 138, 139 on the measuring device 3, each of which gives a pulse that can be identified by their duration.

Because both, the position and the orientation of the front face of the club head are known, the spatial relationship between the group of reflectors 7, 7a and the club face 69 of the club head (and of the sweet spot) can be calculated and can be saved for each golf club 1 of each player 9, individually. Depending on the player and the selected club, these stored calibration data are invoked automatically at the beginning of each set of swings.

If at least a second rotating reflective light barrier is arranged in the calibrator (133) at a defined vertical distance to the first rotating reflective light barrier 137, the beams 140 of the different reflective light barriers can by laser distance measurements and/or by triangulation determine the different depths of the reflectors 19, 20, 21, 22, 23, 97, 98, 99 of the group of reflectors 7, 7a at the two height levels, if the group of reflectors 7, 7a is arranged at to the golf club 1 parallel to the golf club shaft 27 as shown in FIG. 3. Because during calibration, the golf club is held at the angle of its static lie angle in the calibration setup, the group of reflectors, too takes the angle of the static lie angle. Hence the distance of the first lower rotating reflective light barrier 137 from the group of reflectors 7, 7a is smaller than the distance of the second upper rotating reflective light barrier from the group of reflectors 7, 7a. From the determined values the information output- and storage unit 17 can calculate the static lie angle of the golf club 1. This value influences the calculation of the hitting parameters. There is evidence that the manufacturer's data for the dynamic lie angle are not always correct. The static lie angle may also have been altered by fitting of the golf club 1.

In another embodiment of the invention at least one rotating reflective light barrier 137 of the calibration appliance may be replaced by at least one non-rotating reflective light barrier whose transmitter and receiver are arranged outside the calibrator 133 and connected with minimally two optical fibers, whereas a first optical fiber is connected to the light transmitter and a second optical fiber to the receiver of the reflective light barrier.

In the calibrator 133 a moving unit is applied that lets the beam exit horizontally and which moves it at constant angular velocity around the vertical axis. If the moving unit performs a shuttling movement, the movement of the beam can be brought about by making the ends of the optical fibers move together with the moving unit to which they are firmly attached. Alternatively, with motionless mounted ends of the optical fibers, the movement of the beam can be brought about by one or several mirrors on the moving unit which may perform a rotatory movement in this case (rotating mirror).

Depending on the sense of rotation, the beam from the transmitter of the reflective light barrier 137 sweeps over the reflector 138 besides and behind the group of reflectors 7, 7a, then over the group of reflectors 7, 7 that is to be calibrated and finally over the reflector 139 on the other side of and behind the group of reflectors 7, 7a, or vice versa.

On the retroreflective surfaces 8 of the reflector 138, of the group of reflectors 7, 7a and of the reflectors 139, the beams of at least one reflective light barrier elicits temporally staggered pulses. The second optical fiber transmits the pulses to the receiver of the respective light barrier for subsequent transfer to the data acquisition system where the calibration data are processed according to the invention.

Alternatively, the receivers of the reflective light barriers of the calibrator 133 may be arranged stationarily in the calibrator if their horizontal optical aperture is sufficient to receive safely the reflections from the reflector 138, from the group of reflectors 7, 7a, and from the reflector 139 while the beam sweeps successively over them.

Although several embodiments of the present invention have been shown and described, it is to be understood that many changes and modifications may be made thereunto without departing from the spirit and scope of the invention.

What is claimed is:

1. A measuring system for measuring hitting parameters of a golf club, the measuring system comprising:
    a measurement device equipped with a first reflective light barrier having a first receiver, the first reflective light barrier being horizontally directed and able to send a first beam,
    a data acquisition device integrated into the measurement device,
    at least three reflectors having respective retroreflective surfaces, corresponding functionally to the first reflective light barrier, having a defined geometry, and comprising at least three strip-shaped reflectors,
    an information output- and storage unit, the data acquisition device being able to forward acquired measured data to the information output- and storage unit, and
    a clamp-connection device connected to the at least three reflectors, the clamp-connection device being attachable to a shaft of a golf club with a tight, but detachable clamp-connection, wherein the measuring system is arranged such that:
    the first beam produced by the measuring device projects at a right angle to a swing path of a club head of the golf club near at least one of a tee and a golf ball when a golfer opposite to the measurement device swings the golf club, and
        the three retroreflective surfaces upon crossing the first beam elicit temporally staggered pulse-shaped measuring data, the first receiver of the first reflective light barrier receiving the temporally staggered pulse-shaped measuring data and forwarding the temporally staggered pulse-shaped measuring data to the data acquisition device as the acquired measured data.

2. The measuring system according to claim 1, wherein the measurement device further comprises a side wall and a second reflective light barrier,
    wherein the first reflective light barrier is arranged in the side wall,
    wherein the second reflective light barrier is arranged in the side wall with a lateral distance with respect to the first reflective light barrier, and
    wherein the second reflective light barrier sends a second beam, the second beam crossing the first beam of the first reflective light barrier at an acute angle.

3. The measuring system according to claim 2, wherein the measurement device further comprises a third reflective light barrier in the side wall and above the first reflective light barrier, the third reflective light barrier being able to send a third beam paralleling the first beam of the first reflective light barrier, and
    wherein the measurement device further comprises a fourth reflective light barrier in the side wall and above the second reflective light barrier, the fourth reflective light barrier being able to send a fourth beam paralleling the second.

4. The measuring system according to claim 3, wherein the measurement device further comprises a fifth reflective light barrier in the side wall and mounted above the third reflective light barrier, the fifth reflective light barrier being able to send a fifth beam,
    wherein the measurement device further comprises a sixth reflective light barrier in the side wall and mounted above the fourth reflective light barrier, the sixth reflective light barrier being able to send a sixth beam,
    wherein a distance of the first reflective light barrier from the fifth reflective light barrier is at least 7 cm, and
    wherein a distance of the second reflective light barrier from the sixth reflective light barrier is at least 7 cm.

5. The measuring system according to claim 4, wherein the first, third, and fifth reflective light barriers are mounted at an angle of 90 degrees to the side wall in a way that the first, third, and fifth beams run parallel to each other,
    wherein the second, fourth, and sixth reflective light barriers are mounted to the side wall in a way that the second, fourth, and sixth beams run parallel to each other, and
    wherein the measuring system is arranged such that:
        the first, third, and fifth beams run parallel to a playing surface and point towards the at least three reflectors above a lie point for golfing without the golf ball,
        the second, fourth, and sixth beams run parallel to the playing surface, and
        the second, fourth, and sixth beams cross the first, third, and fifth beams maximally 10 cm behind the lie point and behind the swing path.

6. The measuring system according to claim 4, wherein the measuring device further comprises a seventh reflective light barrier able to produce a seventh beam paralleling the first, third, and fifth beams,
    wherein the measuring device further comprises an eighth reflective light barrier pointing at an angle of 90° and mounted at the side wall left or right of the first reflective light barrier,
    wherein the measuring device further comprises a ninth reflective light barrier pointing at 90° placed beside the third reflective light barrier and above the eighth reflective light barrier, wherein the measuring device further comprises a tenth reflective light barrier pointing at 45° and mounted left or right of the fourth reflective light barrier, and wherein a lateral distance of at least one set of reflective light barriers selected from the group consisting of: the first and eighth reflective light barriers, the third and ninth reflective light barriers, and the fourth and tenth reflective light barriers corresponds to a width of the at least three reflectors or to twice a width of the at least three reflectors.

7. The measuring system according to claim 4, wherein the measuring device is designed symmetrically with respect to a horizontal midplane of the measuring device such that the fifth reflective light barrier is mounted to the measuring device in a mirror inverted way with respect to the first reflective light barrier and the sixth reflective light barrier is mounted to the measuring device in a mirror inverted way with respect to the second reflective light barrier, and wherein the measuring device further comprises an integrated position sensor, the integrated position sensor ensuring that the fifth reflective light barrier takes over a function of the first reflective light barrier when the measuring system is switched for an opposite-handed user and ensuring that the sixth reflective light barrier takes over a function of the second reflective light barrier when the measuring system is switched for the opposite-handed user.

8. The measuring system according to claim 4, wherein the measuring device further comprises a seventh reflective light barrier able to produce a seventh beam paralleling the first, third, and fifth beams, and wherein a first reflector of the at least three reflectors is extended by a reflector pin or by tagging a retroreflective surface above the of at least three reflectors directly to the shaft when the at least three reflectors are attached to the shaft.

9. The measuring system according to claim 8, further comprising a folding mechanism, wherein the seventh reflective light barrier is mounted pivotably to an upper side or a lower side of a main body of the measuring device by the folding mechanism, or wherein the seventh reflective light barrier comprises an accessory attachable to a main body of the measuring device by plug-type connector.

10. The measuring system according to claim 4, wherein the measuring device is designed L-shaped and has a transverse wall, wherein the measuring device further comprises a high speed radar transceiver mounted in a front face of the transverse wall, the high speed radar transceiver being able to send a radar beam, and wherein the measuring system is arranged such that when the at least three reflectors are attached to the shaft of the golf club:

the high speed radar transceiver is directed towards at least one of the golf ball and the tee, the radar beam interacts with a reflector of the at least three reflectors to measure by Doppler frequency analysis a hitting parameter comprising a club head speed of the club head of the golf club, the high speed radar transceiver measures the club head speed as a function of time while the club head sojourns in reach of a lobe of the radar beam, and exploiting a temporal relation to pulses of the first, third, and fifth reflective light barriers formed from the at least three reflectors, the information output- and storage unit calculates the club head speed as a function of a position of the club head.

11. The measuring system according to claim 10, wherein the measuring device further comprises a microprocessor or a signal-processor for triggering an actual measuring process, and wherein the measuring system is arranged such that when the at least three reflectors are attached to the shaft of the golf club:

the microprocessor or the signal-processor calculates the club head speed of the club head, and the high speed radar transceiver distinguishes by radar analysis with an inphase/quadrature mixer oscillating movements of the golf club and a direction of the movement and starts the forwarding of the acquired measured data to the data acquisition device only when the club head speed exceeds a preset speed during a downswing of the golf club.

12. The measuring system according to claim 4, wherein at least one of the first, third, and fifth reflective light barriers issues an impulse able to trigger further, external analysis devices.

13. The measuring system according to claim 4, wherein the first, second, third, fourth, fifth, and sixth reflective light barriers are not arranged as compact units directly in the side wall of the measurement device, wherein the first, second, third, fourth, fifth, and sixth reflective light barriers comprise optical fibers and send the first, second, third, fourth, fifth, and sixth beams, respectively, via the optical fibers to defined arranged respective apertures in the side wall, wherein diameters of the defined arranged respective apertures match diameters of the optical fibers, and wherein the measuring system is arranged such that ends of the optical fibers are fixed in the defined arranged respective apertures in a way that the first, third, and fifth beams exit the optical fibers at a right angle with respect to the swing path of the club head and the second, fourth, and sixth beams exit the optical fibers at an angle of 45 degrees with respect to the swing path of the club head near at least one of the tee and the golf ball.

14. The measuring system according to claim 13, wherein the first reflective light barrier further comprises a first transmitter, wherein the second reflective light barrier further comprises a second receiver and a second transmitter, wherein the third reflective light barrier further comprises a third receiver and a third transmitter, wherein the fourth reflective light barrier further comprises a fourth receiver and a fourth transmitter, wherein the fifth reflective light barrier further comprises a fifth receiver and a fifth transmitter, wherein the sixth reflective light barrier further comprises a sixth receiver and a sixth transmitter, wherein the optical fibers are alotted to each of the first transmitter, the second transmitter, the third transmitter, the fourth transmitter, the fifth transmitter, and the sixth transmitter, and wherein the first, second, third, fourth, fifth, and sixth receivers are arranged in the side wall of the measuring device adjacent to or in the defined arranged respective apertures.

15. The measuring system according to claim 13, wherein the measuring device further comprises at least one light transmitter, and wherein a number of the light transmitters of the at least one light transmitter is smaller than six.

16. The measuring system according to claim 4, wherein the measuring system is arranged such that:

when the measurement device is opposite to the golfer, the tee is placed left, as seen from the golfer, from a potential lie point at a distance, the distance corresponding at least to half of a width of the at least three reflectors, and when the at least three reflectors are attached to the shaft of the golf club and when the golf ball lies on the tee, the club head hits the golf ball lying on the tee immediately after the at least three reflectors have left a region of the first, third, and fifth beams.

17. The measuring system according to claim 4, wherein the measuring device further comprises optical fibers comprising first optical fibers and second optical fibers, wherein the first, second, third, fourth, fifth, and sixth reflective light barriers send their respective first, second, third, fourth, fifth, and sixth beams via the optical fibers to defined arranged respective apertures in the side wall of the measuring device, wherein the first optical fibers and the second optical fibers are arranged in each aperture of the defined arranged respective apertures, wherein the second reflective light barrier comprises a second receiver, wherein the third reflective light barrier comprises a third receiver, wherein the fourth reflective light barrier comprises a fourth receiver, wherein the fifth reflective light barrier comprises a fifth receiver, wherein the sixth reflective light barrier comprises a sixth receiver, wherein the first optical fibers and the second optical fibers are allocated to each of the first, second, third, fourth, fifth, and sixth receivers, and wherein the measuring system is arranged such that ends of the optical fibers are fixed in the defined arranged respective apertures in a way that the first, third, and fifth beams exit the optical fibers at a right angle with respect to the swing path of the club head and the second, fourth, and sixth beams exit the optical fibers at an angle of 45 degrees with respect to the swing path of the club head near at least one of the tee and the golf ball.

18. The measuring system according to claim 1, wherein each reflector of the at least three reflectors comprises an intrinsically stable basic body made of a material, the material being dimensionally stable and flexurally rigid at speeds of up to 230 km/h, wherein the clamp-connection device ensures a captive, slip-proof, yet detachable fixing to the shaft above the club head when the at least three reflectors are attached to the shaft, and wherein the measuring system is arranged such that a distance of a lower edge of the at least three reflectors from a playing surface amounts to about 1 cm plus a height of the golf ball plus a height of a long tee.

19. The measuring system according to claim 1, wherein the at least three reflectors comprise a high/narrow group of reflectors comprising a first reflector having a first length, a second reflector having a second length, and a third reflector, wherein the first length is different from the second length, wherein the first reflector and the second reflector are arranged vertically and paralleling each other, wherein the second reflector is arranged offset forwardly or backwardly with respect to a plane of the first and third reflectors, wherein a lower end of the second reflector is linked to an upper end of the third reflector by a first joining piece such that a defined distance is formed between the second reflector and the third reflector, and wherein an upper end of the first reflector is linked to an upper end of the second reflector by second and third angled joininq pieces in a stabilizing way.

20. The measuring system according to claim 1; wherein the at least three reflectors comprise a high/narrow group of reflectors comprising a first reflector, a second reflector, and a third reflector, and wherein the first reflector is directly glueable on the shaft arranged at a defined distance to the second and third reflectors when the at least three reflectors are attached to the shaft via the clamp-connection device.

21. The measuring system according to claim 1, wherein the at least three reflectors comprise a low/wide group of reflectors comprising first, second, third, fourth, and fifth reflectors, wherein the first, third, and fifth reflectors are arranged parallel to each other in a first plane, wherein the first reflector and the third reflector are joined by the second reflector in a way that the first, second, and third reflectors form an "N" or a mirror-imaged "N", and wherein the fourth reflector is arranged outside the first plane but running parallel and at equal distance to the third reflector and the fifth reflector so that in top view on the low/wide group of reflectors a triangle between the third reflector, the fourth reflector, and the fifth reflector is discernible.

22. The measuring system according to claim 1, wherein the at least three reflectors are mountable to the golf club in a way that the at least three reflectors stand vertically with respect to a playing surface when the golf club is held inclined in an addressing position.

23. The measuring system according to claim 1, wherein the at least three reflectors are mountable to the golf club in a way that the at least three reflectors run in parallel with the shaft of the golf club.

24. The measuring system according to claim 1, wherein the first reflective light barrier is a fast responding reflective laser light barrier and the first beam is a high-frequency-pulsed laser beam, and wherein the at least three reflectors have a first width at least as large as a beam width of the first beam.

25. The measuring system according to claim 1, wherein the measuring device further comprises a first optical line laser able to send a first optical line laser beam, and wherein the measuring system is arranged such that the first optical line laser points horizontally at an angle of 90 degrees to the golf ball in a way that the first optical line laser beam meets at a meeting point a surface of the golf ball opposite to a direction of flight of the golf ball, the meeting point constituting an ideal contact point for the club head.

26. The measuring system according to claim 25, wherein the measuring device is designed L-shaped having a transverse wall and further comprises a second optical line laser mounted in the transverse wall, the second optical line laser being able to send a second optical line laser beam and wherein the measuring system can be is arranged such that the second optical line laser beam is sent at an angle of 45 degrees to the golf ball and an intersection of the first optical line laser beam and the second optical line laser beam serves to align at least one of the golf ball and the tee.

27. The measuring system according to claim 26, wherein the measuring device further comprises:
a side wall,
a first adjustment laser mounted in the side wall and able to send a first adjustment beam, and
a second adjustment laser mounted in the transverse wall and able to send a second adjustment beam, and
wherein the measuring system is arranged such that whenever the measuring device is properly aligned in a position required for exact measurements, the first adjustment beam intersects the second adjustment beam on a specific line on a template pulled over the tee.

28. The measuring system according to claim 1, wherein the data acquisition unit, when the at least three reflectors are attached to the shaft of the golf club, captures, during a golf swing of the golf club, a temporal pattern of reflections from the at least three reflectors and can forward forwards the temporal pattern to the information output- and storage unit as raw data, and
wherein from the raw data the information output- and storage unit can determine determines at least one hitting parameter of the golf swing, the at least one hitting parameter being selected from the group consisting of: a club head speed, a club face position as angle open/closed, a sweet spot vertical as vertical deviation from a sweet spot, a sweet spot horizontal as horizontal deviation from the sweet spot, a horizontal angle of approach in/out, and a dynamic loft.

29. The measuring system according to claim 1, wherein the data acquisition unit comprises a sound card or a multi-channel data acquisition- and processing unit, the sound card or the multi-channel data acquisition- and processing unit being equipped with software to interpret the acquired measured data,
wherein the measuring device is designed L-shaped, has a transverse wall, and has a battery integrated to the transverse wall, and
wherein the information output- and storage unit or the battery supplies the measuring device with power.

30. The measuring system according to claim 25, wherein the measuring device further comprises first and second wheels at a transverse axis of the measuring device,
wherein the measuring device further comprises a first handle above a longitudinal axis of the measuring device and a second handle below the longitudinal axis near the first optical line laser,
wherein the second and first handles serve as supporting stands for the measuring device in a right- or left-hander mode, respectively, and
wherein a height of the first and second handles and a diameter of the first and second wheels ensure horizontal orientation of the measuring device.

31. The measuring system according to claim 1, wherein the measuring device further comprises a plurality of optically or capacitively actuated switches mounted to a side wall of the measuring device, the plurality of optically or capacitively actuated switches being able to be activated by the club head and being able to launch or reset a program of the information output- and storage unit.

32. The measuring system according to claim 1, further comprising a wall and a folding or retractable mechanism,
wherein the measuring device is arranged stationarily and theft-proof in paneling of the wall, and
wherein a transverse axis of the measuring device may be brought via the folding or retractable mechanism to a position needed for playing.

* * * * *

UNITED STATES PATENT AND TRADEMARK OFFICE
CERTIFICATE OF CORRECTION

PATENT NO. : 8,142,301 B2
APPLICATION NO. : 12/079099
DATED : March 27, 2012
INVENTOR(S) : Haag et al.

Page 1 of 1

It is certified that error appears in the above-identified patent and that said Letters Patent is hereby corrected as shown below:

In the Claims

In particular, in Column 24, line 25 (Claim 3) after the word "second", please insert the word: -- beam --.

In Column 25, line 45 (Claim 9) after the word "by", please insert the word: -- a --.

In Column 26, line 14 (Claim 11) please delete the word: "the". (second occurrence)

In Column 28, line 7 (Claim 19) please change "joininq" to correctly read: -- joining --.

In Column 28, line 61 (Claim 26) after the word "system", please delete the words: "can be".

In Column 28, line 63 (Claim 26) after "45", please insert the phrase: -- less than or equal to --.

In Column 29, line 17 (Claim 28) after the word "and", please delete the words: "can forward".

In Column 29, line 21 (Claim 28) after the word "unit", please delete the words: "can determine".

Signed and Sealed this
Eleventh Day of June, 2013

Teresa Stanek Rea
*Acting Director of the United States Patent and Trademark Office*